(12) United States Patent
Yanoo

(10) Patent No.: US 9,027,123 B2
(45) Date of Patent: May 5, 2015

(54) DATA DEPENDENCE ANALYZER, INFORMATION PROCESSOR, DATA DEPENDENCE ANALYSIS METHOD AND PROGRAM

(75) Inventor: Kazuo Yanoo, Tokyo (JP)

(73) Assignee: NEC Corporation, Tokyo (JP)

( * ) Notice: Subject to any disclaimer, the term of this patent is extended or adjusted under 35 U.S.C. 154(b) by 556 days.

(21) Appl. No.: 13/132,233

(22) PCT Filed: Nov. 25, 2009

(86) PCT No.: PCT/JP2009/069837
§ 371 (c)(1), (2), (4) Date: Jun. 1, 2011

(87) PCT Pub. No.: WO2010/067703
PCT Pub. Date: Jun. 17, 2010

(65) Prior Publication Data
US 2011/0239309 A1    Sep. 29, 2011

(30) Foreign Application Priority Data

Dec. 8, 2008    (JP) ................................. 2008-312242

(51) Int. Cl.
*G06F 11/00* (2006.01)
*H04L 29/06* (2006.01)
(Continued)

(52) U.S. Cl.
CPC .......... *H04L 63/105* (2013.01); *G06F 11/3476* (2013.01); *G06F 21/55* (2013.01); *G06F 2221/2113* (2013.01); *H04L 63/0428* (2013.01)

(58) Field of Classification Search
CPC ... H04L 63/0428; H04L 63/105; H04L 63/14; H04L 63/1408; H04L 63/1416; H04L 63/1425; H04L 63/16; H04L 2463/101; H04L 2463/146; G06F 21/00; G06F 21/10; G06F 21/16; G06F 21/50; G06F 21/52; G06F 21/552; G06F 21/554; G06F 21/60; G06F 21/606; G06F 2221/2101; G06F 2221/2107

USPC .............. 726/26–27, 30, 32, 22–24; 713/189, 713/193; 380/201; 707/646, 648, 695, 703; 719/312, 320, 329; 714/25, 27, 37, 39
See application file for complete search history.

(56) References Cited

U.S. PATENT DOCUMENTS 5,652,885 A * 7/1997 Reed et al. ........................ 713/1
5,870,467 A 2/1999 Imai et al.
(Continued)

FOREIGN PATENT DOCUMENTS

EP 1207443 A2 * 5/2002
EP 1892620 A1 * 2/2008
(Continued)

OTHER PUBLICATIONS

King, Samuel T. "Analyzing Intrusions Using Operating System Level Information Flow" [Online], 2006 [Retrieved on Jul. 23, 2013], University of Michigan [Retrieved from: http://web.eecs.umich.edu/virtual/papers/king06_1.pdf].*

(Continued)

*Primary Examiner* — Saleh Najjar
*Assistant Examiner* — Eric W Shepperd
(74) *Attorney, Agent, or Firm* — Foley & Lardner LLP

(57) ABSTRACT

A data dependence analyzer includes: inter-process communication detection means which, on the basis of a processing content of inter-process communication performed for transferring data to be copied between resources, detects the inter-process communication; access detection means which successively detects an access event to the data in the resource due to the process; recording means which, for each of the access events detected by the access detection means, records the access target data in the access event; and analysis means which, among the access target data recorded by the recording means, searches data respectively corresponding to the copy source and the copy destination of the data transferred through the inter-process communication detected by the inter-process communication detection means and imparts a dependence relationship between the searched data.

8 Claims, 33 Drawing Sheets

171

| LOG | | | | |
|---|---|---|---|---|
| NUMBER | TIME | TYPE | PROCESS NAME | TARGET |
| 1 | 00:00:00 | read | wordpad | C:¥doc¥aaa.txt |
| 2 | 00:01:00 | read | winword | C:¥doc¥bbb.doc |
| 3 | 00:02:00 | read | winword | C:¥doc¥ccc.doc |
| 4 | 00:03:00 | ipc | winword | wordpad |
| 5 | 00:04:00 | write | wordpad | C:¥doc¥ddd.doc |
| : | : | : | : | : |

(51) Int. Cl.
*G06F 21/55* (2013.01)
*G06F 11/34* (2006.01)

(56) References Cited

U.S. PATENT DOCUMENTS

| | | | |
|---|---|---|---|
| 5,913,041 A * | 6/1999 | Ramanathan et al. | 709/233 |
| 6,192,410 B1 * | 2/2001 | Miller et al. | 709/232 |
| 6,226,694 B1 * | 5/2001 | Constant et al. | 713/375 |
| 6,505,300 B2 * | 1/2003 | Chan et al. | 713/164 |
| 6,807,388 B1 * | 10/2004 | Kojima et al. | 399/80 |
| 7,103,874 B2 * | 9/2006 | McCollum et al. | 717/121 |
| 7,356,594 B2 * | 4/2008 | Khawand et al. | 709/226 |
| 7,539,132 B2 * | 5/2009 | Werner et al. | 370/229 |
| 7,571,302 B1 * | 8/2009 | Chen et al. | 712/217 |
| 7,774,604 B2 * | 8/2010 | Lowe et al. | 713/176 |
| 7,814,021 B2 | 10/2010 | Stamos et al. | |
| 7,991,747 B1 * | 8/2011 | Upadhyay et al. | 707/674 |
| 2003/0056117 A1 * | 3/2003 | Elgressy et al. | 713/201 |
| 2003/0120936 A1 * | 6/2003 | Farris et al. | 713/189 |
| 2005/0114187 A1 * | 5/2005 | Adachi et al. | 705/7 |
| 2005/0182966 A1 * | 8/2005 | Pham et al. | 713/201 |
| 2005/0265331 A1 * | 12/2005 | Stolfo | 370/389 |
| 2006/0010337 A1 * | 1/2006 | Suzuki | 714/4 |
| 2007/0113282 A1 * | 5/2007 | Ross | 726/22 |
| 2007/0198420 A1 * | 8/2007 | Goldstein | 705/52 |
| 2007/0266390 A1 * | 11/2007 | Emmerich | 718/105 |
| 2008/0270515 A1 * | 10/2008 | Chen et al. | 709/202 |
| 2009/0024424 A1 * | 1/2009 | T et al. | 705/7 |
| 2009/0063587 A1 * | 3/2009 | Jakob | 707/203 |
| 2009/0144305 A1 * | 6/2009 | Little | 707/101 |
| 2010/0088137 A1 * | 4/2010 | Weiss et al. | 705/8 |
| 2011/0066719 A1 * | 3/2011 | Miryanov et al. | 709/224 |

FOREIGN PATENT DOCUMENTS

| | | |
|---|---|---|
| JP | 8-87440 A | 4/1996 |
| JP | 2002-232451 A | 8/2002 |
| JP | 2002-288030 A | 10/2002 |
| JP | 2005-275669 A | 10/2005 |
| JP | 2006-92149 A | 4/2006 |
| JP | 2006-155416 A | 6/2006 |
| JP | 2002-209649 A | 8/2006 |
| JP | 2006-525562 A | 11/2006 |
| JP | 2008-27389 A | 2/2008 |

OTHER PUBLICATIONS

Lampson, Butler W. "A Note on the Confinement Problem" [Online], Jul. 1978 [Retrieved on: Jul. 23, 2013], Communications of the ACM, [Retrieved from: http://www.cs.umd.edu/~jkatz/TEACHING/comp_sec_F04/downloads/confinement.pdf ].*

Bell et al. "Secure computer system: unified exposition and multics interpretation" [Online], 1976 [Retrieved on: Jul. 23, 2013], Technical Report MTR-2997, Rev. 1, MITRE Corp., [Retrieved from: http://csrc.nist.gov/publications/history/bel176.pdf ].*

Samuel T. King et al., Backtracking Intrusions, ACM Transactions on Computer Systems, vol. 23, No. 1, Feb. 2005, pp. 51-76.

Feng Qin et al., LIFT: A Low-Overhead Practical Information Flow Tracking System for Detecting Security Attacks. The 39th Annual IEEE/ACM International Symposium on Microarchiteture (MICRO'06), 2006, 12 pages.

Prateek Saxena et al., Efficient Fine-Grained Binary Instrumentation with Applications to Taint-Tracking, CGO '08, 2008, 10 pages.

Nikkei Network, "Carelessness" Causes Information Leakage to Outside, Aug. 2008, pp. 58-69.

* cited by examiner

| | | | LOG | |
|---|---|---|---|---|
| NUMBER | TIME | TYPE | PROCESS NAME | TARGET |
| 1 | 00:00:00 | read | wordpad | C:¥doc¥aaa.txt |
| 2 | 00:01:00 | read | winword | C:¥doc¥bbb.doc |
| 3 | 00:02:00 | read | winword | C:¥doc¥ccc.doc |
| 4 | 00:03:00 | ipc | winword | wordpad |
| 5 | 00:04:00 | write | wordpad | C:¥doc¥ddd.doc |
| ⋮ | ⋮ | ⋮ | ⋮ | ⋮ |

Fig.6

```
bool HasDependency(IPCData&data)
{
 if (data. Protocol == COM {
  if (data. com. interface == "IDataObject") {
   if (data. com. method == "GetData") {
     return true;         S91
   }
   else if (data. Com. Method == "QueryGetData") {
     return false;        S93
   }
  ...
     return true;         S95
}
```

| | LOG | | | | |
|---|---|---|---|---|---|
| NUMBER | TIME | TYPE | PROCESS NAME | TARGET | DATA SIZE |
| 1 | 00:00:00 | read | wordpad | C:¥doc¥aaa.txt | 2 |
| 2 | 00:01:00 | read | winword | C:¥doc¥bbb.doc | 2 |
| 3 | 00:02:00 | read | winword | C:¥doc¥ccc.doc | 2 |
| 4 | 00:03:00 | ipc | winword | wordpad | 1 |
| 5 | 00:04:00 | write | wordpad | C:¥doc¥ddd.doc | 2 |
| ... | ... | ... | ... | ... | |

Fig.12

| ANALYSIS RESULT ||| 
|---|---|---|
| SEARCH TARGET FILE | DEPENDENCE SOURCE | DEGREE OF DEPENDENCE |
| C:¥doc¥ddd.doc | C:¥doc¥aaa.txt | 2 |
| | C:¥doc¥bbb.doc | 1 |
| | C:¥doc¥ccc.doc | 1 |
| ⋮ | ⋮ | ⋮ |

```
bool HasDependency(IPCData&data)
{
 if (data. Protocol == COM {
  if (data. com. interface == "IDataObject") {
   if (data. Com. Method == "GetData") {
    int size = GetDataSize(data.com.args);
    if (size > 0x1000)
      return 2;          S91a
    else
      return 1;          S93a
   }
   else if (data. Com. Method == "QueryGetData") {
      return 0;          S95a
   }
   ...
     return 2;           S97a
}
```

Fig.17

| | 1561 |
|---|---|
| DEFINITION INFORMATION | |
| SYSTEM CALL | EXPLANATION |
| read() | READ FILE SPECIFIED BY FIRST ARGUMENT AND STORE READ FILE TO ADDRESS OF SECOND ARGUMENT |
| write() | WRITE DATA HAVING SIZE OF THIRD ARGUMENT FROM ADDRESS OF SECOND ARGUMENT TO FILE SPECIFIED BY FIRST ARGUMENT |
| ⋮ | ⋮ |

Fig.18

LOG 171

| NUMBER | TIME | TYPE | PROCESS NAME | TARGET | DEPENDENCE SOURCE |
|---|---|---|---|---|---|
| 1 | 00:00:00 | read | wordpad | C:¥doc¥aaa.txt | — |
| 2 | 00:01:00 | read | winword | C:¥doc¥bbb.doc | — |
| 3 | 00:02:00 | read | winword | C:¥doc¥ccc.doc | — |
| 4 | 00:03:00 | ipc | winword | wordpad | C:¥doc¥ccc.doc |
| 5 | 00:04:00 | write | wordpad | C:¥doc¥ddd.doc | C:¥doc¥aaa.txt, C:¥doc¥ccc.doc |
| ... | ... | ... | ... | ... | ... |

| | | | LOG | | |
|---|---|---|---|---|---|
| NUMBER | TIME | PROCESSING CONTENT | PROCESS NAME | TARGET | SECURITY LEVEL |
| 1 | 00:00:00 | read | wordpad | C:¥doc¥aaa.txt | 0 |
| 2 | 00:01:00 | read | winword | C:¥doc¥bbb.doc | 1 |
| 3 | 00:02:00 | read | winword | C:¥doc¥ccc.doc | 0 |
| 4 | 00:03:00 | ipc | winword | wordpad | 0 |
| 5 | 00:04:00 | write | wordpad | C:¥doc¥ddd.doc | 0 |
| : | : | : | : | : | : |

DATA DEPENDENCE ANALYZER, INFORMATION PROCESSOR, DATA DEPENDENCE ANALYSIS METHOD AND PROGRAM

This application is the National Phase of PCT/JP2009/069837, tiled Nov. 25, 2011, which claims priority to Japanese Application No. 2008-312242 tiled Dec. 8, 2008, the disclosures of which are hereby incorporated by reference in their entirety.

TECHNICAL FIELD

The present invention relates to a technique for monitoring or managing a flow of data.

BACKGROUND ART

Various kinds of information are exchanged on an IT (Information Technology) system, and it is important to suitably monitor or manage the flow of these kinds of information according to the degree of confidentiality of the information.

When the flow of the data is insufficiently monitored, information leakage occurs. It is possible to simply exchange information by using, for example, an USB (Universal Serial Bus) memory, but information leakage occurs, for example, when the USB memory is lost.

In order to prevent such information leakage, a so-called DLP (Data Loss Prevention) tool described in Non Patent Literature 1 monitors information leakage on the basis of the degree of similarity of data which are exchanged. In particular, a system using the DLP tool prevents information leakage in such a manner that a feature of information having high confidentiality is written in the policy beforehand so as to detect that the data having feature are written to a USB memory or attached to an e-mail to be transmitted to an untrusted destination.

Non Patent Literature 2 proposes a method for hooking a system call and tracking not only a file input/output and network I/O (Input/Output) but also inter-process communication using a memory map.

Further, an access management system described in Patent Literature 1 collects, as logs, events of file input/output and network input/output occurring in a PC (Personal Computer). In the logs, operations, such as an input/output of a file, a change of a file name, writing to a USB memory, and network communication, performed during a process are recorded so as to be associated with time, the name of the process, and a user name. By checking the logs, the access management system can track the original name of the file written to the USB memory, the copy source of the file, and the like, so as to monitor or prevent the leakage of information.

Patent Literature 2 discloses a method in which a computer reads a filter program used to monitor a user's operation for application software and detects data transfer between the applications so as to thereby prevent unauthorized inter-process communication. With this method, the computer can obtain the dependence relationship between data transferred only through inter-process communication for transferring the data between applications. However, in this method, the computer needs to create a filter program for each piece of application software.

Here, the dependence relationship between data means a relationship between a certain data and the other data, all or part of the certain data being formed by copying all or part of the other data.

Patent Literature 3 discloses a method which monitors a user's operation for application software and detects the state of the application software, and which performs analysis by combining the operation and the state. With this method, the computer can comparatively accurately track not only the inter-process communication but also the flow of information inside the process, so as to obtain an accurate dependence relationship between data. However, in this method, the computer needs to acquire a file in which a rule for detecting the state of each piece of application software is written.

CITATION LIST

Non Patent Literature

Non Patent Literature 1: '"Carelessness" causes information leakage to outside', August, 2008, pp. 58-69, Nikkei NETWORK Non Patent Literature 2: SAMUEL T. KING and PETER, M. CHEN, "Backtracking Intrusions", ACM Transactions on Computer Systems, Vol. 23, No. 1, February 2005

Patent Literature

Patent Literature 1: JP2006-525562A1
Patent Literature 2: JP2006-092149A
Patent Literature 3: JP2006-155416A

SUMMARY OF INVENTION

Technical Problem

However, an excessive dependence relationship is likely to be acquired by the method described in Non Patent Literature 1, Non Patent Literature 2, or Patent Literature 1.

Here, the excessive dependence relationship means a case where, even though data are not copied, the data are deteiflined to have a dependence relationship.

For example, during drag-and-drop (during drag) operation in Windows (registered trademark), inter-process communication (IPC) is intermittently performed between the process of the drag source and the process pointed by the mouse cursor. However, in this IPC, the communication is performed to determine the shape of mouse cursor, and there is no substantial flow of information.

In the method described in Non Patent Literature 1, Non Patent Literature 2, or Patent Literature 3, a dependence relationship is produced irrespective of the content of IPC. Thus, even in such a case where there is no substantial flow of information, it is determined by the method that there is a dependence relationship. This results in a problem in which many excessive dependence relationships are acquired and thereby data cannot be accurately tracked.

The computers described in Patent Literatures 2 and 3 need to create a filter program or a state detection rule for each piece of application software. For this reason, in the techniques, much labor and time are required for tracking data, and hence it is difficult to track the flow of the data. Further, there is a problem in which some data cannot be detected by the filter program, and the like, and hence it is difficult to track the flow of the data.

An object of the present invention is to provide a technique which enables the flow of data to be easily and accurately tracked.

Solution to Problem

To this end, a data dependence analyzer according to the present invention includes: inter-process communication detection means which, on the basis of processing content of inter-process communication, detects the inter-process communication performed for transferring data to be copied between resources; access detection means which successively detects an access event to access the data in the resource during the process; recording means which, for each of the access events detected by the access detection means, records the access target data in the access event; and analysis means which, among the access target data recorded by the recording means, searches data respectively corresponding to the copy source and the copy destination of the data transferred through the inter-process communication detected by the inter-process communication detection means and imparts a dependence relationship between the searched data.

A data dependence analysis method according to the present invention is a method in which, on the basis of processing content of inter-process communication, inter-process communication detection means detects the inter-process communication performed for transferring data to be copied between resources, in which access detection means successively detects an access event to access the data in the resource during the process, in which, for each of the access events detected by the access detection means, recording means records the access target data in the access event, and in which, among access target data recorded by the recording means, analysis means searches data respectively corresponding to the copy source and the copy destination of the data transferred through the inter-process communication detected by the inter-process communication detection means and imparts a dependence relationship between the searched data.

A program according to the present invention is a program for executing: an inter-process communication detection procedure for, on the basis of processing content of inter-process communication, detecting the inter-process communication performed for transferring data to be copied between resources; an access detection procedure for successively detecting an access event to access the data in the resource during the process; a recording procedure for, for each of the access events detected by the access detection means, recording the access target data in the access event; and an analysis procedure for, among access target data recorded by the recording means, searching data respectively corresponding to the copy source and the copy destination of the data transferred through the inter-process communication detected by the inter-process communication detection means and imparting a dependence relationship between the searched data.

Advantageous Effects of Invention

According to the present invention, the data dependence analyzer detects inter-process communication performed for transferring data to be copied between resources, on the basis of the processing content of the inter-process communication. Thus, the data dependence analyzer can detect the copy of the data without performing complicated operations, such as an operation to create the filter program and the state detection rule for each application, and hence can easily track the flow of the data. Further, the data dependence analyzer imparts the dependence relationship between the data respectively corresponding to the copy destination and the copy source of the data transferred through the detected inter-process communication, and hence can accurately track the flow of the data.

BRIEF DESCRIPTION OF DRAWINGS

FIG. 2 shows a table in which the content of logs of the first exemplary embodiment according to the present invention is summarized.

FIG. 6 shows an example of a computer program for operating the computer of the first exemplary embodiment according to the present invention.

FIG. 8(*b*) is a figure showing a user's file operation.
FIG. 9(*b*) is a figure showing a user's file operation.

FIG. 11 shows a table in which the content of logs of a second exemplary embodiment according to the present invention is summarized.

FIG. 12 shows a table in which content of an analysis result of the second exemplary embodiment according to the present invention is summarized.

FIG. 14 shows an example of a computer program for operating the computer of the second exemplary embodiment according to the present invention.

FIG. 17 shows a table in which the content of definition information of the third exemplary embodiment according to the present invention is summarized.

FIG. 18 shows a table in which the content of logs of the third exemplary embodiment according to the present invention is summarized.

FIG. 22 shows a table in which the content of logs of the fourth exemplary embodiment according to the present invention is summarized.

DESCRIPTION OF EMBODIMENTS

Exemplary embodiments according to the present invention will be described in detail with reference to the accompanying drawings.

Figure 1:
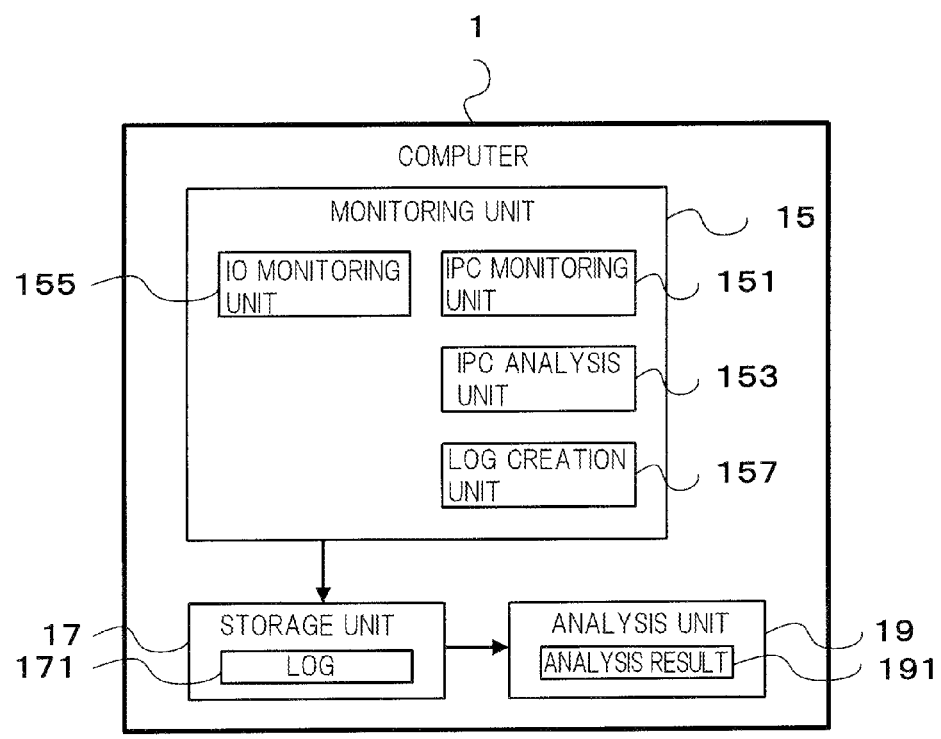
FIG. 1 is a block diagram showing a configuration of a computer of a first exemplary embodiment according to the present invention.

FIG. 1 is a block diagram showing a configuration of computer 1 according to the present exemplary embodiment. Computer 1 is an apparatus for analyzing a dependence relationship between data and for tracking the flow of the data. Referring to FIG. 1, computer 1 includes monitoring unit 15, storage unit 17, and analysis unit 19.

Monitoring unit 15 includes IPC monitoring unit 151, IPC analysis unit 153, IO monitoring unit 155, and log creation unit 157. For example, monitoring unit 15 is included in a part of an operating system (OS). More specifically, monitoring unit 15 can be realized by a method of expanding a kernel, such as a device driver and a system call hook, of the OS. Monitoring unit 15 may also be realized so as to operate not in the kernel mode but in a user mode, such as the application programming interface (API) hook.

IPC monitoring unit 151 monitors (detects) inter-process communication (hereinafter referred to as "IPC"). The inter-process communication is performed by using, for example, a named pipe, a LPC (Local Procedure Call), or a shared memory. IPC monitoring unit 151 monitors the IPC by opening the named pipe, the LPC, the shared memory, and the like, by transmitting data to them, and by mediating a system call for receiving data from them. IPC monitoring unit 151 notifies, to IPC analysis unit 153, the type of protocol of the detected IPC and the processing content of the IP IPC analysis unit 153 determines whether the detected IPC is performed to transfer data to be copied between resources.

A method for obtaining the IPC performed to transfer the data to be copied between the resources will be described in detail. IPC analysis unit 153 acquires the type of communication protocol that is used by the IPC, and the processing contents of the IPC using the protocol. This is because, in some cases, data are not copied that depend upon the type of protocol and content of the IPC, and because, when the dependence relationships between data are obtained for all the IPC, the dependence relationships are excessively obtained.

By using a determination rule based on the type of the protocol and the processing content, IPC analysis unit 153 analyzes data flowing through the channel of the IPC, and thereby determines whether the data have been copied between resources. The determination rule is described on the basis of the expert's determination about whether an explicit information flow exists between the communication source and the communication destination of the IPC which are commonly used between processes.

Here, the resource means a device in computer 1, to and from which device information can be inputted and outputted by the user's operation, and includes, for example, a file in a hard disk or a removable media, and a network connection. The network connection includes data transmission based on, for example, FTP (File Transfer Protocol), HTTP (Hyper Text Transfer Protocol), SMTP (Send Mail Transfer Protocol), and the like.

In the case of a classic communication protocol, IPC analysis unit 153 determines the dependence relationship on the basis of the type of command transmitted through the protocol, the argument of the command, and the like (processing contents). Further, in the case where the protocol of IPC is RPC (Remote Procedure Call), IPC analysis unit 153 determines the dependence relationship on the basis of the name of a procedure, and the argument, and the like, of the procedure (processing procedure). Alternatively, in the case where the protocol of IPC is a COM (Component Object Model) method call, IPC analysis unit 153 determines the dependence relationship on the basis of an interface name, a method name, the argument, and the like, of the method (processing content).

When acquiring the processing contents, IPC analysis unit 153 temporarily stores a system call relating to the IPC each time the system call is issued. This is because one IPC having a certain function is realized by a series of system calls being issued a plurality of times. Further, when one IPC having a certain function is completed, IPC analysis unit 153 reconstructs and acquires the processing contents (communication contents) of the IPC from the temporarily stored processing content.

For example, communication through a named pipe is client-server type communication, and hence there is a case where IPC having a function is realized by communication through the named pipe being made a plurality of times. In this case, IPC analysis unit 153 temporarily stores the content of a series of communication through the named pipe.

The LPC is one of the IPC mechanisms in the WINDOWS (registered trademark) operating system, and is a client-server type communication similar to communication through the named pipe. Also in this case, IPC analysis unit 153 temporarily stores the content of a series of communication made through the named pipe. In particular, the size of data to be transmitted is limited in the LP Thus, when a data having a large data size is transmitted, the data is transmitted by the LPC and by the shared memory. In this case, when reconstructing the content of the IPC communication, IPC analysis unit 153 reconstructs the content of LPC communication together with the content of the shared memory.

IO monitoring unit 155 monitors an access to a resource by a process. IO monitoring unit 155 detects the access by mediating a system call for opening a file and a network socket, and by mediating communication to a file system driver and a network driver from an OS kernel.

Log creation unit 157 creates a log in which an access event to access a resource detected by IO monitoring unit 155, and an IPC event detected by IPC analysis unit 153 are recorded. The details of the recorded contents of the log will be described below.

Log 171 created by log creation unit 157 is stored in storage unit 17. Storage unit 17 is a storage medium, such as, for example, a hard disk. By using a known technique for preventing log tampering, storage unit 17 may prevent tampering of log 171 by a user.

On the basis of the content recorded in log 171, analysis unit 19 analyzes the dependence relationship between data respectively set as access targets at the access events. In other words, for the data set as targets (access targets) at the respective access events, analysis unit 19 determines at which of the access events the mutually dependent data are respectively set as the targets.

More specifically, analysis unit 19 sets one of the files (data) as a search target from among the targets of the access events. Analysis unit 19 searches all of events, the target of which is the search target file, and the type of which is "write". The event satisfying the conditions is set as event Z.

When there is no corresponding event Z, analysis unit 19 determines that there is no file depending on the search target file.

When there is corresponding event Z, analysis unit 19 searches all events which are generated before event Z and which are "read" event (hereinafter referred to as "event W") having the same process name as that of event Z.

Then, analysis unit 19 determines whether there is an IPC event which is generated before event Z and which has the process name of event Z as the target. The event satisfying this condition is set as event W.

When there is an event W, analysis unit 19 searches all "read" events (W) which are generated before event W and which have the same process name as that of event W. Analysis unit 19 determines that the search target file depends on the target of the searched event W.

In this way, analysis unit 19 investigates the dependence relationship for all the files (data) described in the log, and outputs analysis result 191 in which the dependence relationships between the data are described.

FIG. 2 shows a table in which the content of log 171 are summarized. Referring to FIG. 2, "type" of event, "process name" and "target" are recorded in time-series order in log 171.

"Type" is the type of event detected by IO monitoring unit 155 or IPC analysis unit 153. The event detected by IO monitoring unit 155 is an access event to access a resource, and is the reading ("read" or the like) from the resource, or the writing to the resource ("write" or the like). The event detected by IO monitoring unit 155 is an IPC event ("ipc") for transferring the copied data.

"Process name" is an identifier uniquely assigned to the process performed at the event. When the detected event is an IPC event, the name of a process as a communication source is recorded.

When the detected event is an access event, "target" is access target data. When the detected event is an IPC event, "target" is a process as a communication destination.

Figure 3:
FIG. 3 shows a table in which content of an analysis result of the first exemplary embodiment according to the present invention is summarized.

FIG. 3 shows a table in which the content of analysis result 191 is summarized. Referring to FIG. 3, the search target data ("search target file"), and the dependence source data ("dependence source") are described in association with each other in analysis result 191.

Figure 4:
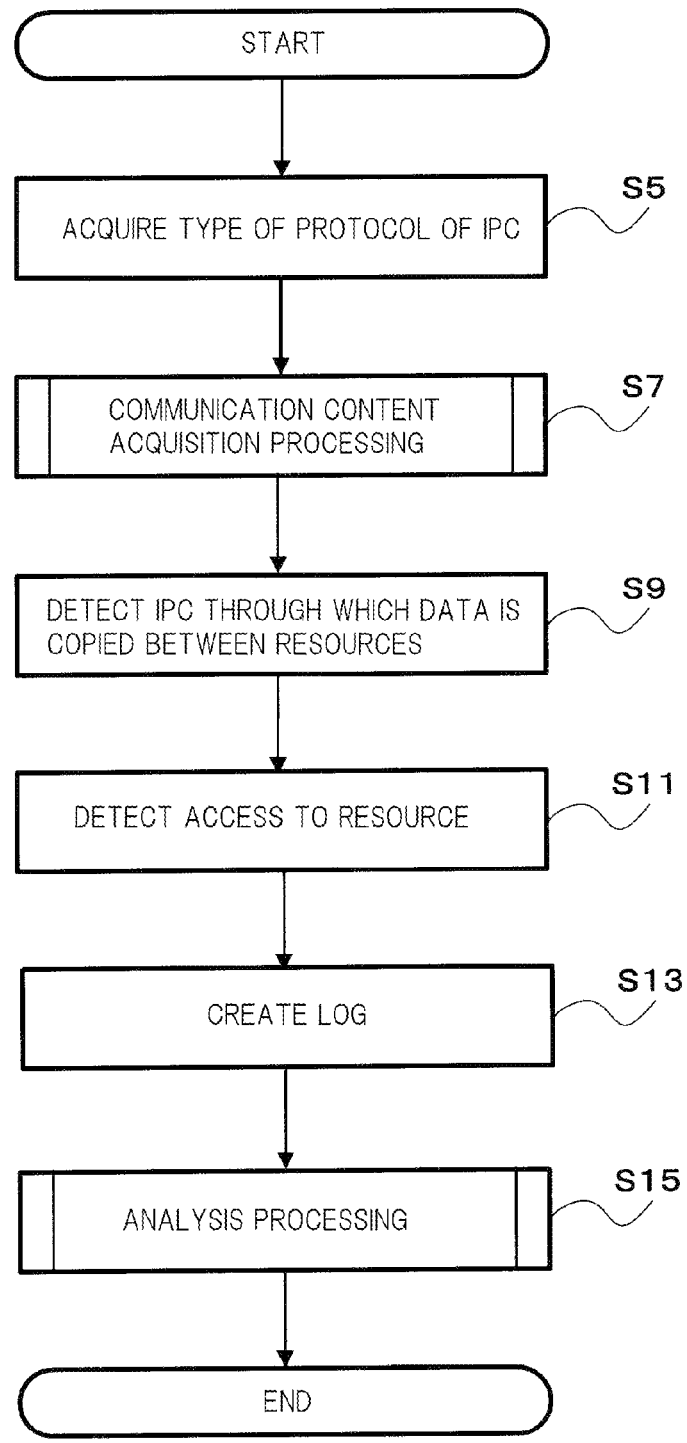
FIG. 4 is a flow chart showing an operation of the computer of the first exemplary embodiment according to the present invention.

Next, operation of computer 1 of the present exemplary embodiment will be described. FIG. 4 is a flow chart showing the operation of computer 1. This operation is started when a predetermined application is executed. Referring to FIG. 4, IPC monitoring unit 151 acquires the type of protocol used in the detected IPC (step S5). IPC monitoring unit 151 performs communication content acquisition processing (step S7). On the basis of the type of protocol and the processing content of the detected IPC, IPC analysis unit 153 detects IPC performed to transfer data to be copied between resources (step S9).

IO monitoring unit 155 detects an access event to access the resource (step S11). Log creation unit 157 creates log 171 in which the access event to access the resource and the IPC event performed to copy the data are recorded, and stores log 171 in storage unit 17 (step S13).

Analysis unit 19 reads log 171 and performs analysis processing (step S15). Computer 1 ends the operation after step S15.

Figure 5:
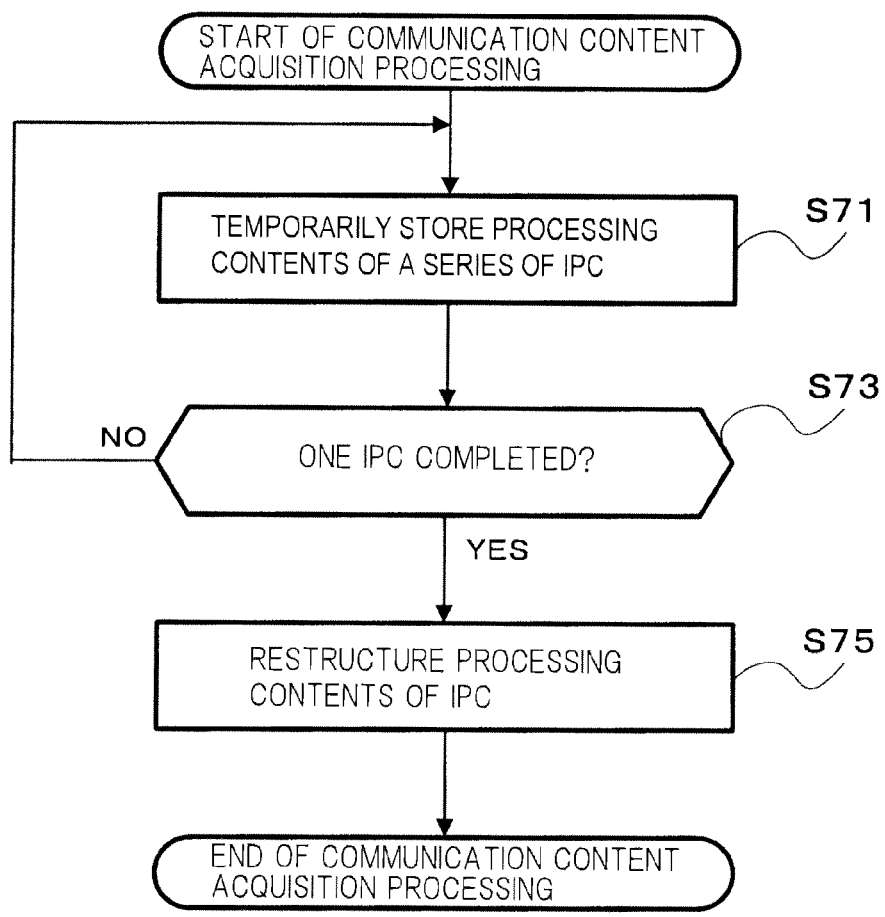
FIG. 5 is a flow chart showing communication content acquisition processing of the first exemplary embodiment according to the present invention.

FIG. 5 is a flow chart showing communication content acquisition processing. Referring to FIG. 5, IPC monitoring unit 151 temporarily stores a series of IPC processing contents (step S71). IPC monitoring unit 151 determines whether one IPC having a certain function is completed (step S73).

If the IPC is not completed (NO in step S73), IPC monitoring unit 151 returns to step S71. If the IPC is completed (YES in step S73), IPC monitoring unit 151 restructures the temporarily stored processing content (communication content) of the IPC, and notifies the restructured processing content to IPC analysis unit 153 (step S75). IPC monitoring unit 151 ends the communication content acquisition processing after step S75.

FIG. 6 shows an example of a computer program which realizes the content of step S9 for detecting IPC through which data is copied between the resources. The computer program in FIG. 6 is written in C++ language. Referring to FIG. 6, in the case where the protocol of the communication content is the COM method call, and where the interface name of the method is "IDataObject" and the name of the method is "GetData", it is determined that data is copied between the resources, that is, a dependence relationship is produced between the resources ("true") (step S91). This method call is issued when drag-and-drop processing based on OLE (Object Linking and Embedding) is performed between processes, and has a function of copying the information held in the drag source process to the drag destination process. Therefore, this method call produces a dependence relationship between data.

In the case where the protocol of the communication contents is the COM method call, and where the interface name of the method is "IDataObject" and the name of the method is "QueryGetData", it is determined that no dependence relationship between data is produced by this IPC communication ("false") (step S93). This method call is issued when the mouse cursor enters inside the window of the drop destination during drag-and-drop processing based on OLE, and hence does not have a function of transmitting information held by the drag source process to the drag destination process. Therefore, this method call produces no dependence relationship between data.

When the protocol of the communication contents does not meet any of the rules in steps S91 and S93, it is determined that a dependence relationship between data is produced by this IPC communication ("true"). This is to prevent the omission of detection of a dependence relationship which may be produced and which cannot be detected even by the determination rules created by experts.

Figure 7:
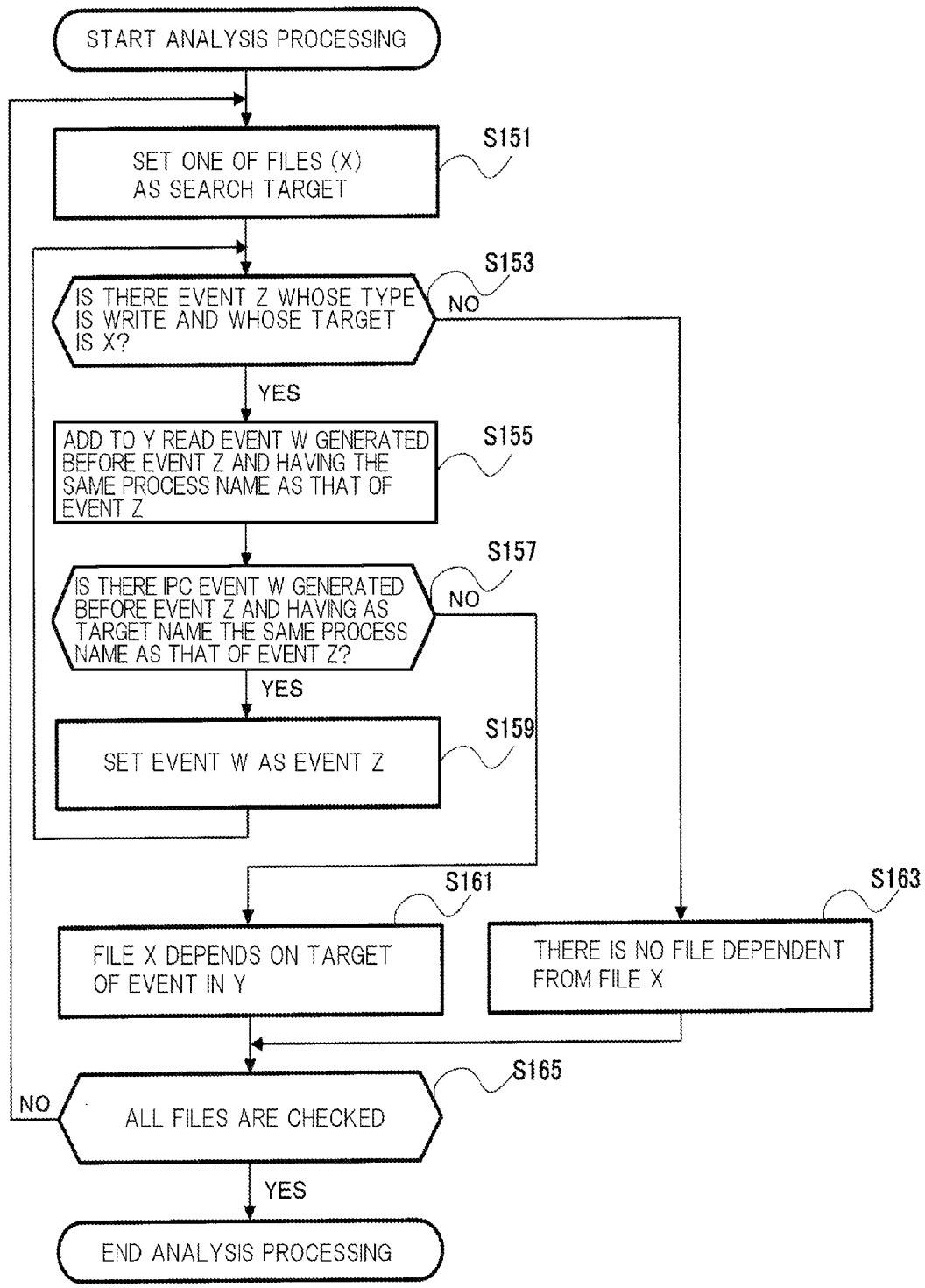
FIG. 7 is a flow chart showing analysis processing of the first exemplary embodiment according to the present invention.

FIG. 7 is a flow chart showing analysis processing. Referring to FIG. 7, analysis unit 19 sets one of the targets of access events as a search target file X (step S151). Analysis unit 19 determines whether event Z whose type is "write" and whose target is file X is recorded in the log (step S153).

When event Z is recorded (YES in step S153), analysis unit 19 searches "read" event W which is generated before event Z and which is associated with the same process name as that of event Z. Analysis unit 19 adds searched event W to set Y (step S155). Set Y is a set of events whose targets are respectively set to data having dependence relationships with file X.

Analysis unit 19 determines whether IPC event W, which is generated before event Z and which is associated with the same process name as that of event Z, is recorded (step S157).

When event W is recorded (YES in step S157), analysis unit 19 sets event W as event Z (step S159), and returns to step S153.

When event W is not recorded in step S157 (No in step S157), analysis unit 19 determines that file X depends on the targets of the events included in set Y, and imparts dependence relationships to these data, so as to write the imparted dependence relationships in analysis result 191 (step S161).

When event Z is not recorded (NO in step S153), analysis unit 19 determines that there is no file dependent from file X (step S163).

After step S161 or step S163, analysis unit 19 determines whether all the files are searched (step S165). When all the files are not searched (NO in step S165), analysis unit 19 returns to step S151. When all the files are searched (YES in step S165), analysis unit 19 ends the analysis processing.

Figure 8:
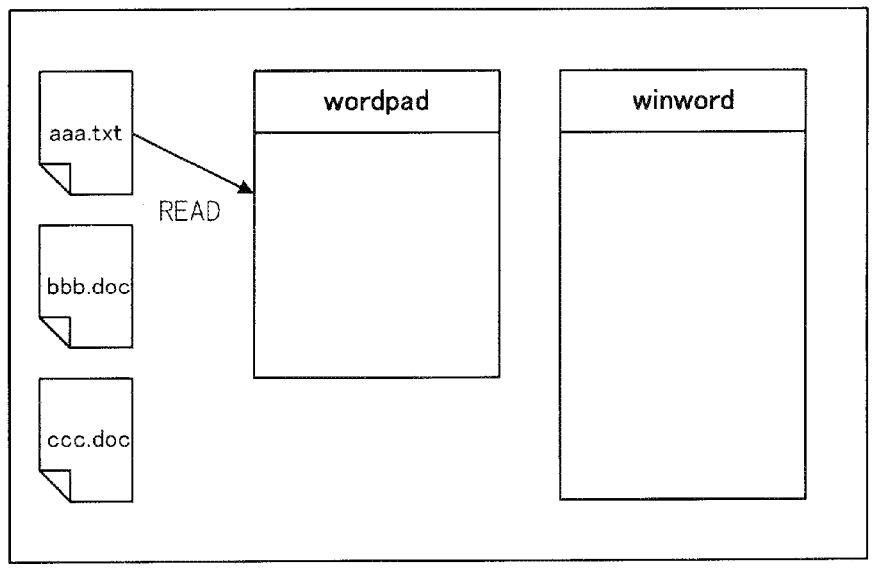
FIG. 8(*a*) is a figure showing a user's file operation.
Figure 8:
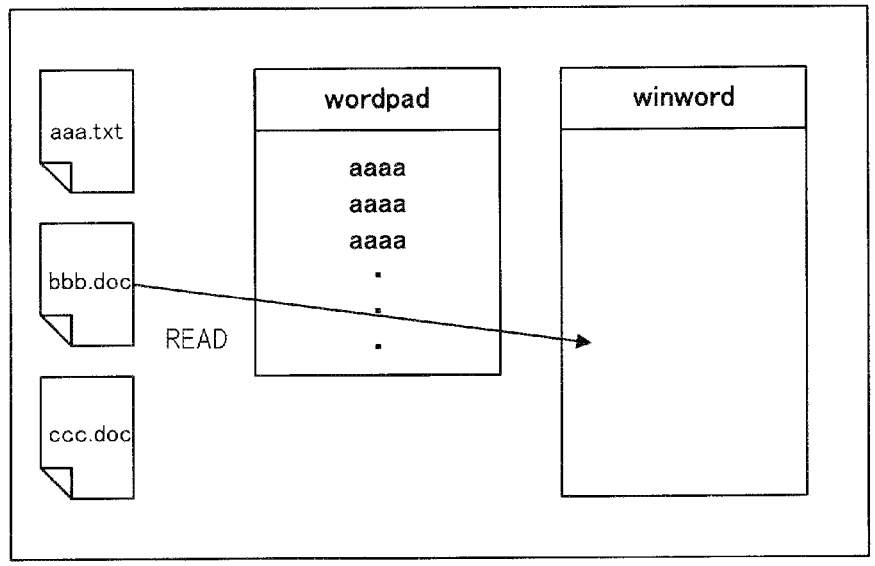
Figure 9:
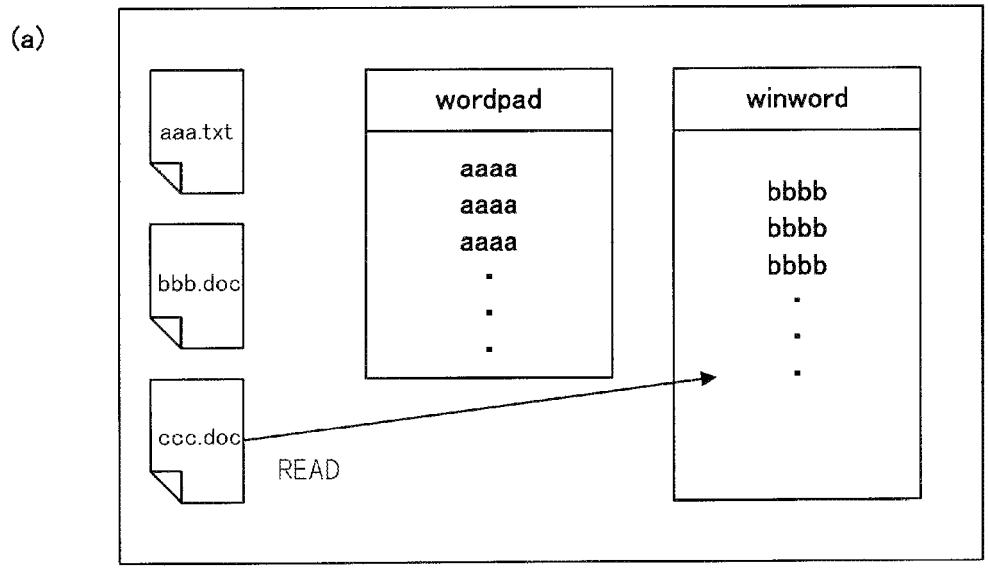
FIG. 9(*a*) is a figure showing a user's file operation.
Figure 9:
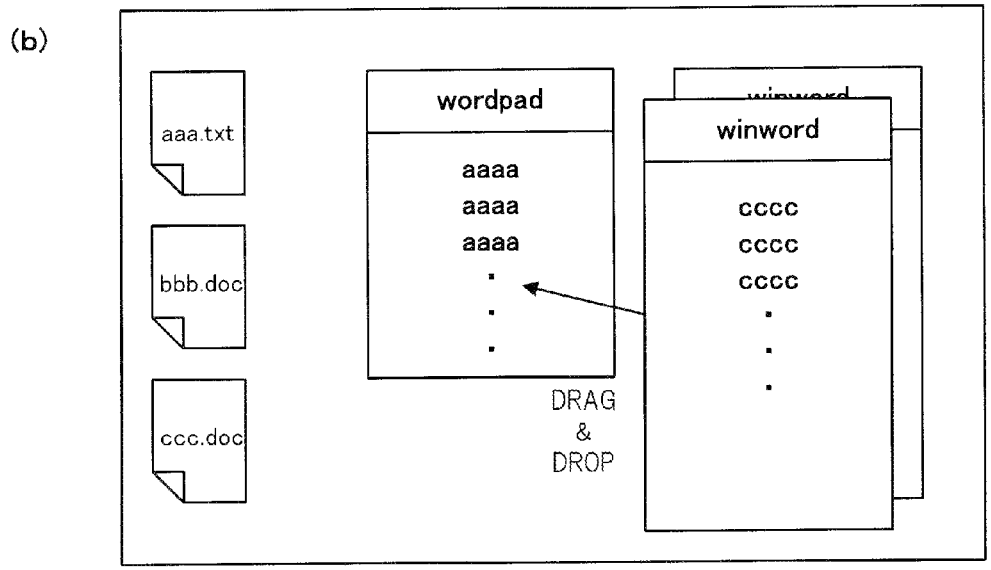

Subsequently, the results of the operation of computer 1 at the time when this file operation is performed will be described by taking an example of user's file operation. FIG. 8(a) to FIG. 10 are figures showing a series of file operations performed by a user. Referring to FIG. 8(a), files of "aaa.txt", "bbb.doc", and "ccdoc" are stored in computer 1, and processes of "WORDPAD (registered trademark) word processor" and "WINWORD (registered trademark) word processor" are started. Here, the user performed an operation of reading the file "aaa.txt" in the process "WORDPAD (registered trademark) word processor."

Then, as shown in FIG. 8(b), the user performed an operation of reading the file "bbb.doc" in the process of "WINWORD (registered trademark) word processor."

Referring to FIG. 9(a), the user opened one more execution screen of "WINWORD (registered trademark) word processor," and performed an operation of reading the file "ccc.doc" in the process of "WINWORD (registered trademark) word processor."

Referring to FIG. 9(b), the user dragged the file "ccc.doc" read into the process "WINWORD (registered trademark) word processor," and dropped the file to the process execution screen "WORDPAD (registered trademark) word processor" so as to make the data of the filed copied.

Finally, the user stored in a resource by setting the read files ("aaa.txt", ccc.doc") as a file "ddd.doc" in the process "WORDPAD (registered trademark) word processor."

When these file operations are perfoimed, computer 1 records access events and IPC events in log 171, as shown in FIG. 2 (step S13). Specifically, when the files are read from
resources in the processes of "WORDPAD (registered trademark) word processor" and "WINWORD (registered trademark) word processor" as shown in FIG. 8(a), FIG. 8(b), and FIG. 9(a), those access events are recorded in time-series order.

Subsequently, in FIG. 9(b), during the drag operation of the file, IPC is intermittently performed between the drag source process and the drag destination process currently pointed by the mouse cursor. However, there is no substantial flow of information in this IPC, and hence the IPC events during this period are not recorded in the log. Since, when the file is dropped in FIG. 9(b), the data is copied between the resources, the IPC event is recorded.

Figure 10:
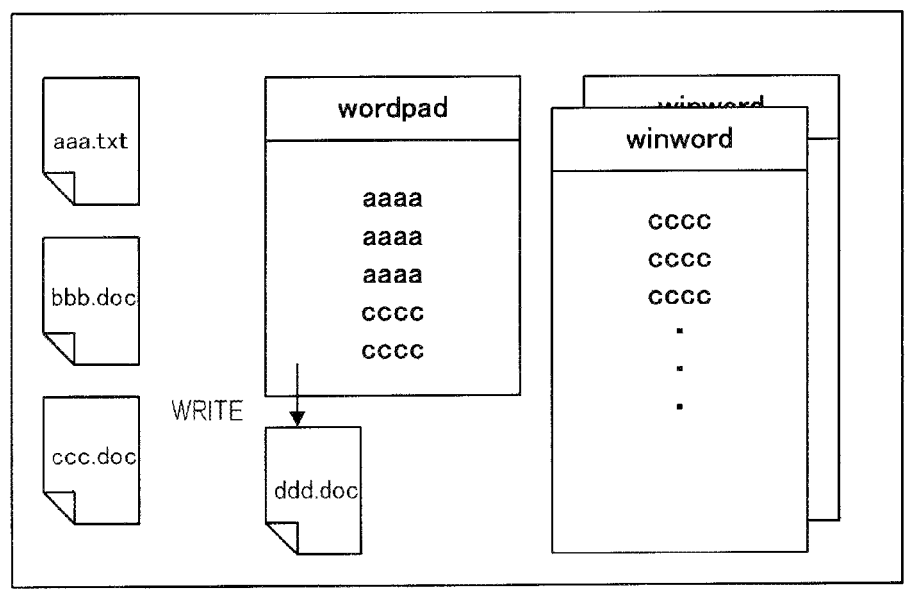
FIG. 10 is a figure showing a user's file operation.

Finally, as shown in FIG. 10, when the files are written in the resource in the process "WORDPAD (registered trademark) word processor", the access events are recorded in time-series order.

Referring to FIG. 3, it is analyzed from log 171 that the file "ddd.doc" is copied from the
files "aaa.txt", "bbb.doc" and a "ccc.doc" through the processes "WORDPAD (registered trademark) word processor" and "WINWORD (registered trademark) word processor."
That is, the file "ddd.doc" file depends on the files "aaa.txt", "bbb.doc", and "ccdoc".

As described above, according to the present exemplary embodiment, since computer 1 (data dependence analyzer) detects, on the basis of the processing contents, communication between processes performed for transferring data to be copied between resources, computer 1 can detect the copy of the data without performing complicated operations, such as operations to create a filter program and a state detection rule for each application, and can easily track the flow of data. Further, the data dependence analyzer imparts a dependence relationship between data respectively corresponding to the copy destination and the copy source of data transferred by the detected inter-process communication, and hence can accurately track the flow of the data.

Further, on the basis of the type of protocol used in inter-process communication and processing content of the inter-process communication, the data dependence analyzer detects inter-process communication performed to transfer data to be copied on the basis of the processing content of the inter-process communication. Thus, the data dependence analyzer can exclude inter-process communication performed by using a protocol that does not transfer copied data, with the result that the data can be accurately tracked.

Analysis unit 19 associates a read event with a write event via an event during the detected inter-process communication, and defines a dependence relationship of the copied data by setting the read data as a copy source and the written data as a copy destination. Thus, even when data are copied via the inter-process communication, the copied data can be accurately tracked.

(Second exemplary embodiment)

A second exemplary embodiment according to the present invention will be described. Computer 1 of the present exemplary embodiment is different from computer 1 of the first exemplary embodiment in that computer 1 further obtains a degree of dependence relationship.

FIG. 11 shows a table in which the content of log 171 created by log creation unit 157 of the present exemplary embodiment is summarized. Referring to FIG. 11, the data size of a target is further recorded in association with each event. In the case of an IPC event, the size of transferred data is recorded. In the present exemplary embodiment, when the data size is larger than a predetermined value, "2" is recorded in the column "data size", and when the data size is not larger than the predetermined value, "1" is recorded in the column "data size".

FIG. 12 shows a configuration of analysis result 191 of the present exemplary embodiment. Referring to FIG. 12, "degree of dependence" is further described for each dependence source file in analysis result 191. The degree of dependence is the degree of dependence relationship between data set as targets. When each of data under a dependence relationship has a larger data size, computer 1 evaluates that the data have a larger degree of dependence relationship.

Figure 13:
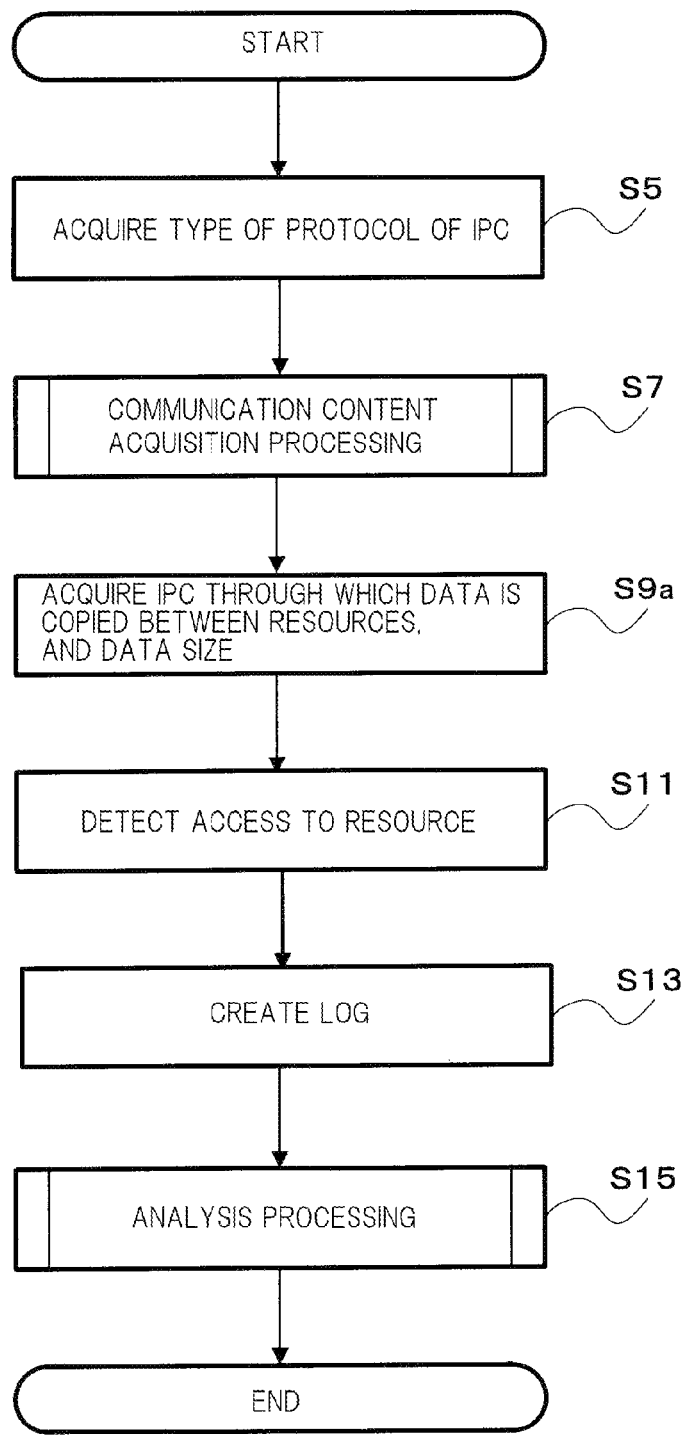
FIG. 13 is a flow chart showing an operation of a computer of the second exemplary embodiment according to the present invention.

FIG. 13 is a flow chart showing an operation of computer 1 of the present exemplary embodiment. Referring to FIG. 13, the operation of computer 1 of the present exemplary embodiment is the same as the operation of computer 1 of the first exemplary embodiment except that step S9a is performed instead of step S9.

In step S9a, IPC analysis unit 153 acquires IPC through which data is copied between resources, and also acquires the data size of the copied data.

FIG. 14 shows an example of a computer program for realizing the processing content of step S9a of the present exemplary embodiment. From the communication content of IPC, IPC analysis unit 153 calculates the size of data subjected to the drag-and-drop operation, and returns "2" when the data size is larger than the predetermined value (step S91a). IPC analysis unit 153 returns "1" when the data size is not larger than the predetermined value. When it is determined from the communication contents of IPC that data is not copied, IPC analysis unit 153 returns "0" (step S95a).

When it is not possible to determine the presence of dependence relationship, IPC analysis unit 153 returns "2" for safety (step S97a).

Log creation unit 157 records the IPC event in log 171, when "1" or "2" is returned by IPC analysis unit 153.

Figure 15:
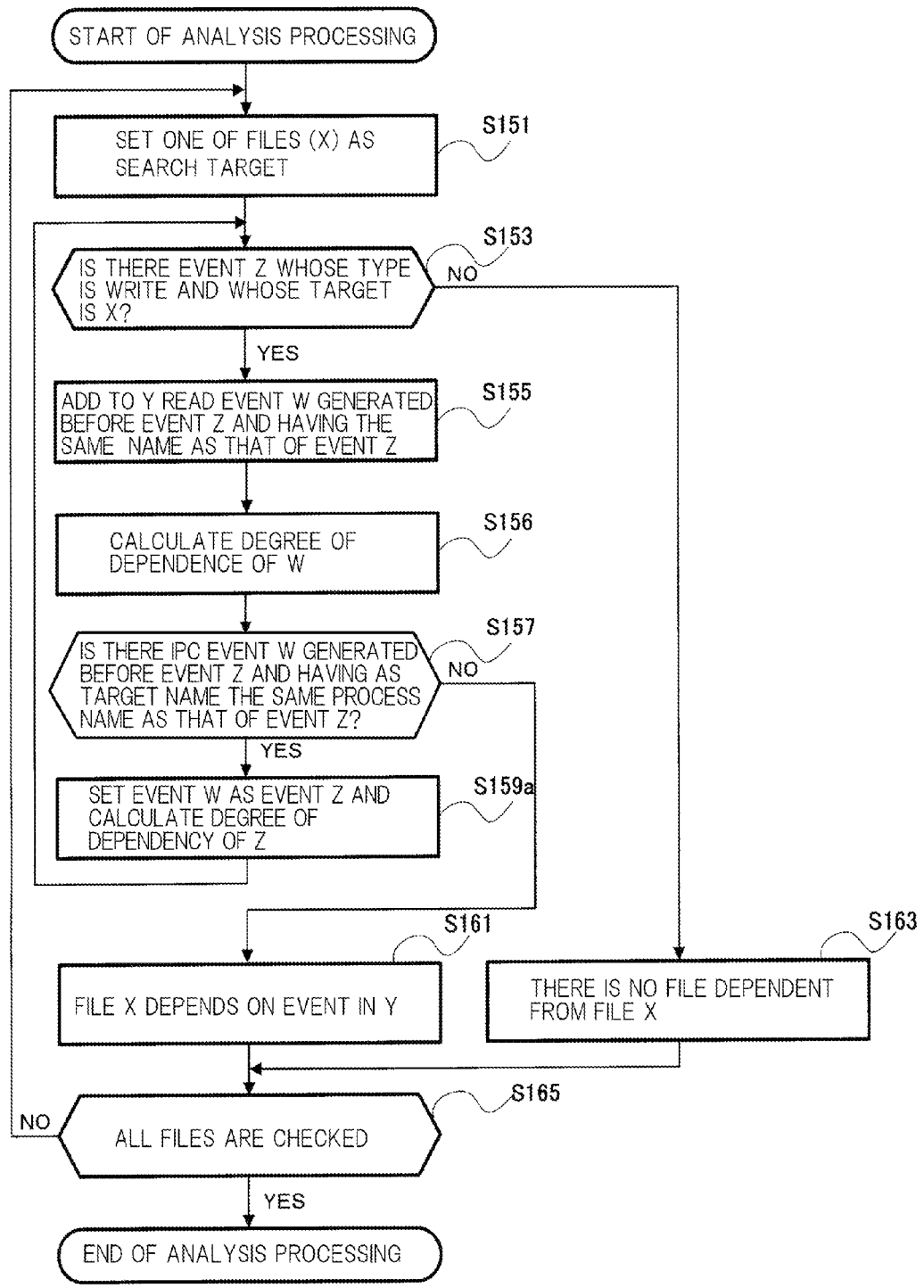
FIG. 15 is a flow chart showing analysis processing of the second exemplary embodiment according to the present invention.

FIG. 15 is a flow chart showing analysis processing of the present exemplary embodiment. Referring to FIG. 15, the analysis processing of the present exemplary embodiment is the same as the analysis processing of the first exemplary embodiment except that analysis unit 19 performs step S156 after step S155 and performs step S159a instead of step S159.

In step S156, analysis unit 19 multiplies the "data size" corresponding to event Z by the "data size" corresponding to event W, and sets the value obtained by the multiplication as "degree of dependence" of event W.

In step S159a, analysis unit 19 calculates the degree of dependence of event Z when event W is set as event Z.

As described above, according to the present exemplary embodiment, computer 1 evaluates an event having a larger target data size as having a higher degree of dependence, and hence can grasp the strength of dependence relationship between data. Computer 1 can further increase the efficiency of data tracking by preferentially tracking data having a strong dependence relationship.

(Third exemplary embodiment)

Figure 16:
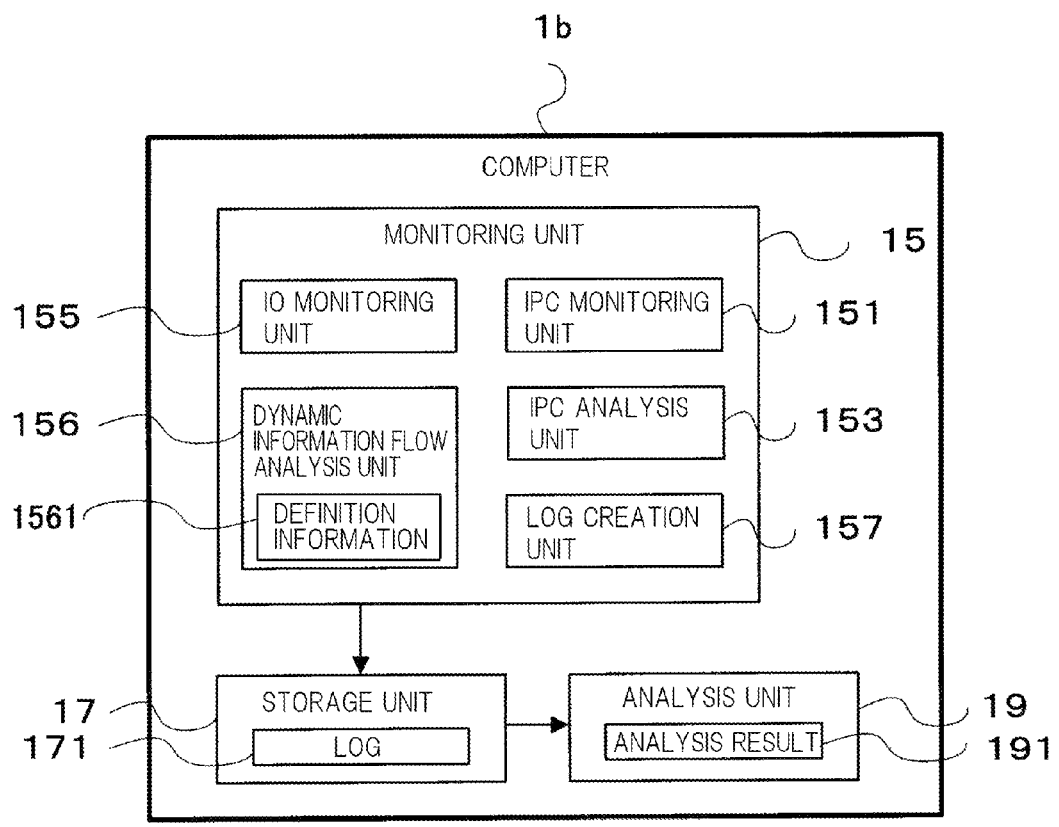
FIG. 16 is a block diagram showing a configuration of a computer of a third exemplary embodiment according to the present invention.

A third exemplary embodiment according to the present invention will be described. FIG. 16 is a block diagram showing a configuration of computer 1b of the present exemplary embodiment. Referring to FIG. 16, computer 1b is different from computer 1 of the first exemplary embodiment in that monitoring unit 15 further includes dynamic information flow analysis unit 156.

By using definition information 1561 in which a system call for initiating reading from a resource by a process and a system call for initiating writing to a resource by the process are defined, dynamic information flow analysis unit 156 checks the transfer of data in the process until the data read from the resource to the process is written out by the process.

Dynamic infoimation flow analysis unit 156 checks the transfer of data in the process by using the method described in Non Patent Literature 3 (Feng Qin, Cheng Wang, Zhenmin Li, and Ho-seop Kim, Yuanyuan Zhou, and Youfeng Wu LIFT: A Low-Overhead Practical Information Flow Tracking System for Detecting Security Attacks ACM/IEEE International Symposium on Microarchitecture (MICRO'06), 2006), or Non Patent Literature 4 (Prateek Saxena, R. Sekar and Varun Puranik: Efficient Fine-Grained Binary Instrumentation with Applications to Taint-Tracking ACM/IEEE International Symposium on Code Generation and Optimization, 2008).

More specifically, dynamic information flow analysis unit 156 determines whether data on a certain memory depends on data on another memory, by associating a memory with a tag representing what information is currently stored in the memory, and by making a process execute codes that are embedded in the process and configured to propagate the tag in correspondence with memory operation processing performed by the process. With this method, when a system call reads data to a memory buffer from a certain resource A, dynamic information flow analysis unit 156 adds a tag corresponding to resource A to the memory buffer. Then, in the case where the tag is propagated according to the processing of the data on the memory buffer and where the contents on the memory buffer are eventually written in another resource B by a system call, when the tag corresponding to resource A is added to the memory buffer, dynamic information flow analysis unit 156 outputs information representing that resource B is dependent on resource A.

In the present exemplary embodiment, for IPC determined by IPC analysis unit 153 as having a dependence relationship, dynamic infoimation flow analysis unit 156 also makes the tag propagate between an input to the IPC and an output from the IP When the data is outputted to a resource or process serving as an output destination (target) in the writing event to the resource or the IPC event, log creation unit 157 specifies, from the tag notified from dynamic information flow analysis unit 156, the resource or process (dependence source) from which the data is originated. Then, log creation unit 157 records, in log 171, not only the type and target of each of the events but also the resource as the dependence source of the event.

When searching a file dependent from search target file X, analysis unit 19 searches a file whose type is "write" and whose target is file ZX. When there is no corresponding file, analysis unit 19 determines that there is no file depending on file X. When there is a corresponding file, analysis unit 19 determines that the dependence source file recorded in association with the file is the dependence source of file X.

FIG. 17 shows a table in which the contents of definition information 1561 of the present exemplary embodiment are summarized. Referring to FIG. 17, a system call (for example, read) for initiating the reading from a resource, and a system call (for example, write) for initiating the writing to a resource are defined in definition information 1561. Definition contents include the name of a system call, and the semantic content of respective arguments (representing a data transfer source, a data transfer destination, and the like).

FIG. 18 shows a table in which the content of log 171 of the present exemplary embodiment is summarized. Referring to FIG. 18, not only the type and target of each of the events but also the data of the dependence source of the event are recorded in log 171.

Figure 19:
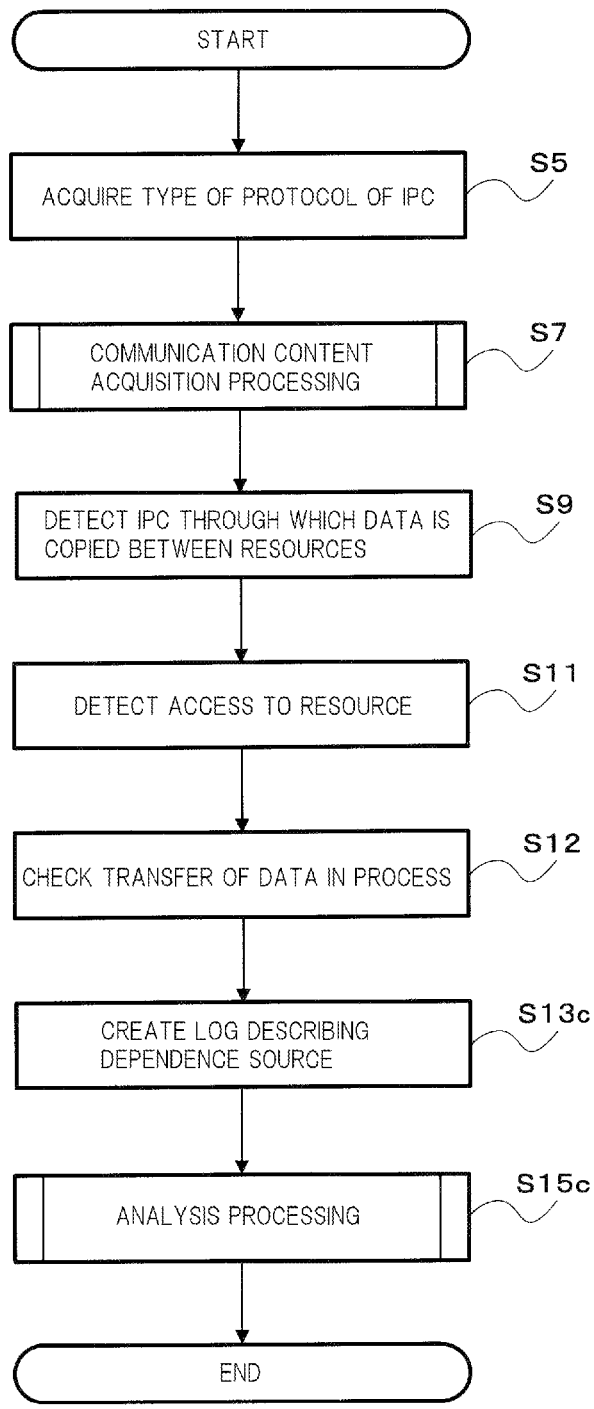
FIG. 19 is a flow chart showing an operation of the computer of the third exemplary embodiment according to the present invention.

FIG. 19 is a flow chart showing an operation of computer 1b of the present exemplary embodiment. Referring to FIG. 19, the operation of computer 1b in the present exemplary embodiment is the same as the operation of computer 1 in the first exemplary embodiment except that computer 1b further performs step S12 after step S11 and performs steps S13c and 15c instead of steps S13 and S15.

After step S11, dynamic information flow analysis unit 156 checks the transfer of data in the process, and outputs information for specifying the resource dependent from the target of IPC or the process (step S12). In each event, log creation unit 157 records the target and the resource as the dependence source in association with the type of the event (step 513c).

Figure 20:
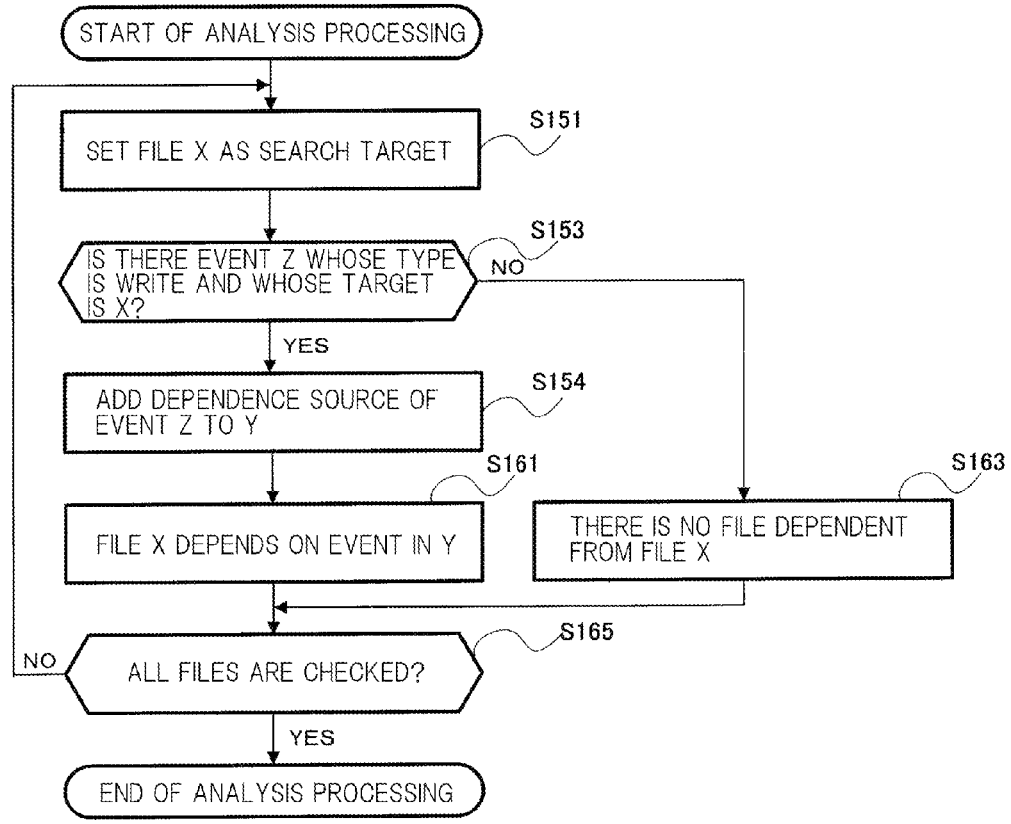
FIG. 20 is a flow chart showing analysis processing of the third exemplary embodiment according to the present invention.

FIG. 20 is a flow chart showing analysis processing (step S15c) of the present exemplary embodiment. Referring to FIG. 20, the analysis processing of the present exemplary embodiment is the same as the analysis processing of the first exemplary embodiment except that step 154 is executed instead of steps S155 to S159.

When event Z, the type of which is "write" and the target of which is file X, is recorded in log 171 (YES in step S 153), analysis unit 19 adds the file dependent from event Z to set Y (step S154). After step S154, analysis unit 19 performs step S161.

As described above, according to the present exemplary embodiment, on the basis of the definition information in which, for the system call for initiating the writing of data, the argument of the transfer source of the data is defined, computer 1b further records, as a copy source, access target data set by the argument of the transfer source in association with the written access target data. Thus, the flow of data can be easily tracked.

For example, in FIG. 3 relating to the first exemplary embodiment, three files (aaa.txt, bbb.doc, ccdoc) are acquired as dependence sources for the search target file (ccdoc).

However, in FIG. 18 in the present exemplary embodiment, only two files (aaa.txt, ccdoc) are acquired as dependence sources of the same target (ccdoc). This is because computer 1 detects the data transfer between processes in the first exemplary embodiment but does not detect the data transfer in the process (data transfer between a memory and a memory buffer, and the like). For this reason, computer 1 of the first exemplary embodiment also sets, as the dependence source, the file (bbb.doc) which is not actually dependent on the search target file (ccdoc), and hence acquires an excessive dependence relationship as compared with the present exemplary embodiment.

However, in the present exemplary embodiment, computer 1b can specify the source of the drag-and-drop operation by using dynamic information flow analysis unit 156, so as to further suppress the excessive production of dependence relationship. Thus, even in the case where the number of resources having dependence relationships is increased in accordance with the progress of editing data, computer 1b can accurately track the data.

(Fourth exemplary embodiment)

Figure 21:
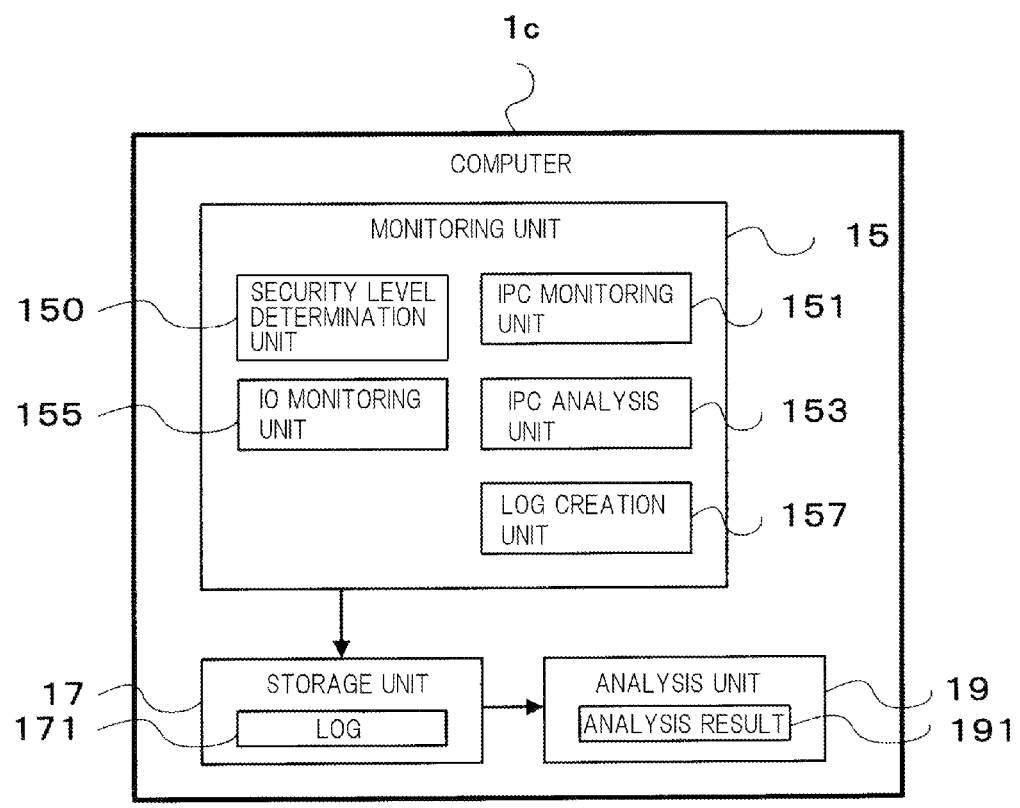
FIG. 21 is a block diagram showing a configuration of a computer of a fourth exemplary embodiment according to the present invention.

A fourth exemplary embodiment according to the present invention will be described. FIG. 21 is a block diagram showing a configuration of computer 1c of the present exemplary embodiment. Referring to FIG. 21, computer 1c is different from computer 1 of the first exemplary embodiment in that computer 1c further includes security level determination unit 150 in monitoring unit 15.

Security level determination unit 150 determines the security level (level of confidentiality) of a resource as a target of reading.

As for the reference of the determination, for example, security level determination unit 150 determines that the security level of a file stored in a specified directory is higher than the security level of a file not stored in the specified directory. Further, security level determination unit 150 determines the degree of security level according to the content of a read file, as described in Log creation unit 157 further records the security level in association with each event.

When searching a read source file corresponding to a search target file, analysis unit 19 sets, as a dependence source, only a file having a security level lower than that of the search target file.

FIG. 22 shows a table in which the content of log 171 of the present exemplary embodiment are summarized. As shown in the FIG. 22, the security level of each target is further recorded in log 171 in association with the each event. The security level is divided into, for example, two stages of "0" (unnecessary to maintain confidentiality), and "1" (necessary to maintain confidentiality).

Figure 23:
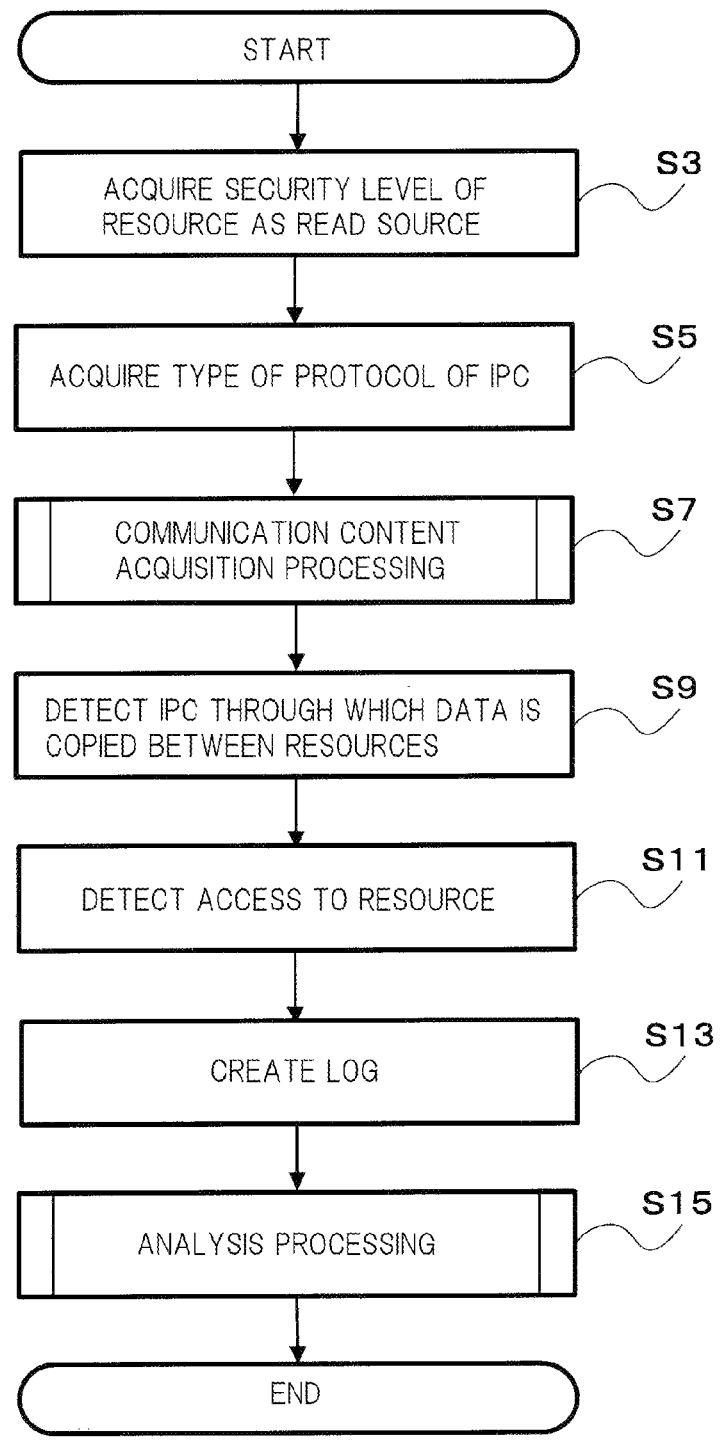
FIG. 23 is a flow chart showing an operation of the computer of the fourth exemplary embodiment according to the present invention.

FIG. 23 is a flow chart showing an operation of computer 1c of the present exemplary embodiment. Referring to FIG. 23, the operation of computer 1c is the same as the operation of computer 1 of the first exemplary embodiment except that security level determination unit 150 performs step S5 after acquiring the security level of a resource as a read source (step S3).

Figure 24:
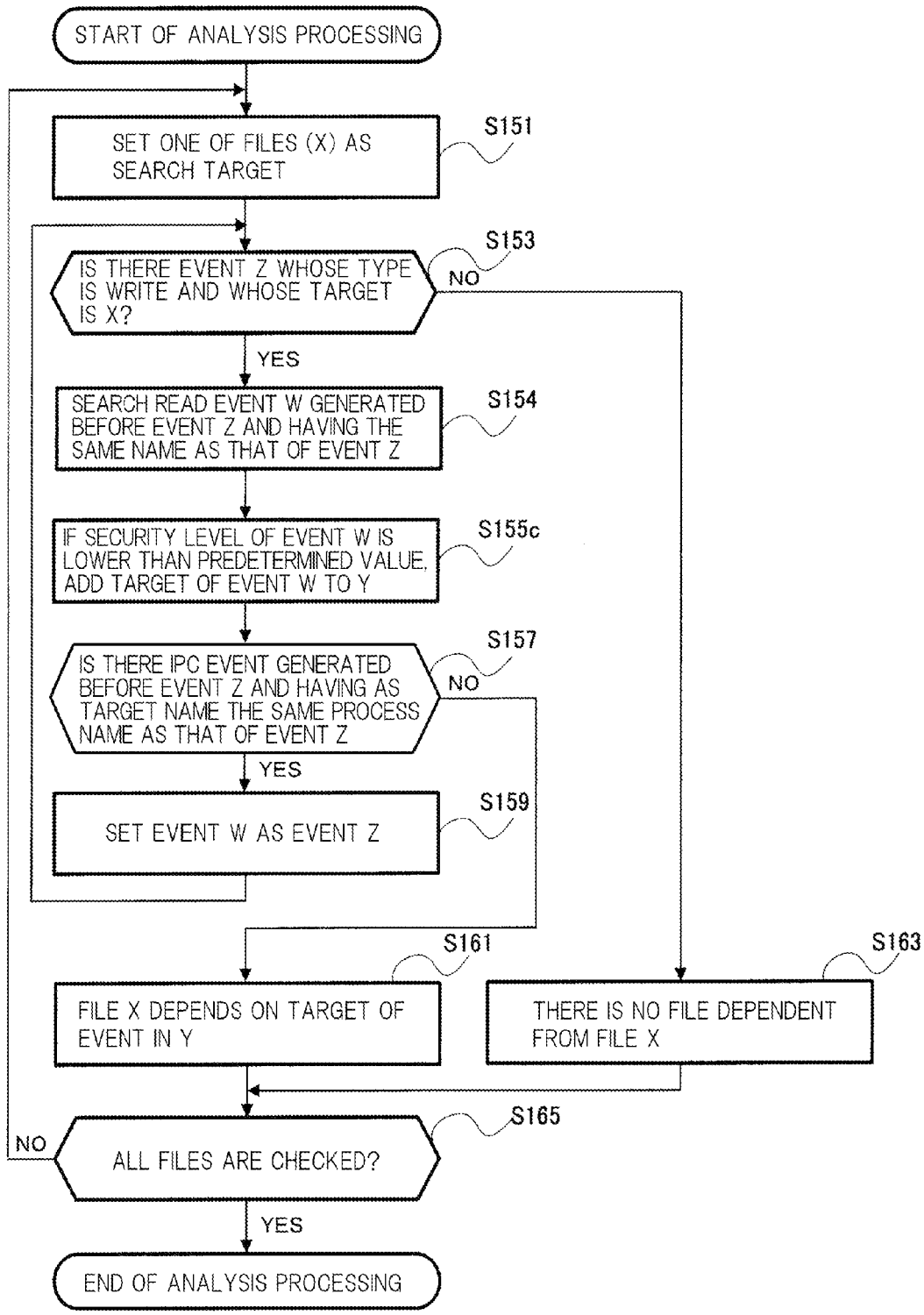
FIG. 24 is a flow chart showing analysis processing of the fourth exemplary embodiment according to the present invention.

FIG. 24 is a flow chart showing analysis processing of the present exemplary embodiment. Referring to FIG. 24, analysis processing of the present exemplary embodiment is the same as that of the analysis processing of the first exemplary embodiment except that analysis unit 19 performs step S154 and S155c instead of step S155.

When there is event Z (YES in step S153), analysis unit 19 searches "read" event W which is generated before event Z, and which is associated with the same process name as that of event Z (step S154). Then, when the security level of searched event W is lower than the security level of event Z, analysis unit 19 adds event W to set Y (step S155c)

As described above, according to the present exemplary embodiment, security level determination unit 150 acquires the security level of a resource serving as a read source, and analysis unit 19 acquires only the dependence relationship between files having security levels that are not lower than a predetermined value. Thus, the operation to acquire the dependence relationship between files having a comparatively low security level is eliminated, so that computer 1c can further increase the efficiency of data tracking.

(Fifth exemplary embodiment)

A fifth exemplary embodiment according to the present invention will be described. The configuration of computer 1c of the present exemplary embodiment is the same as computer 1c of the fourth exemplary embodiment except that log creation unit 157 does not record an access event whose security level is not higher than a predetermined value.

Figure 25:
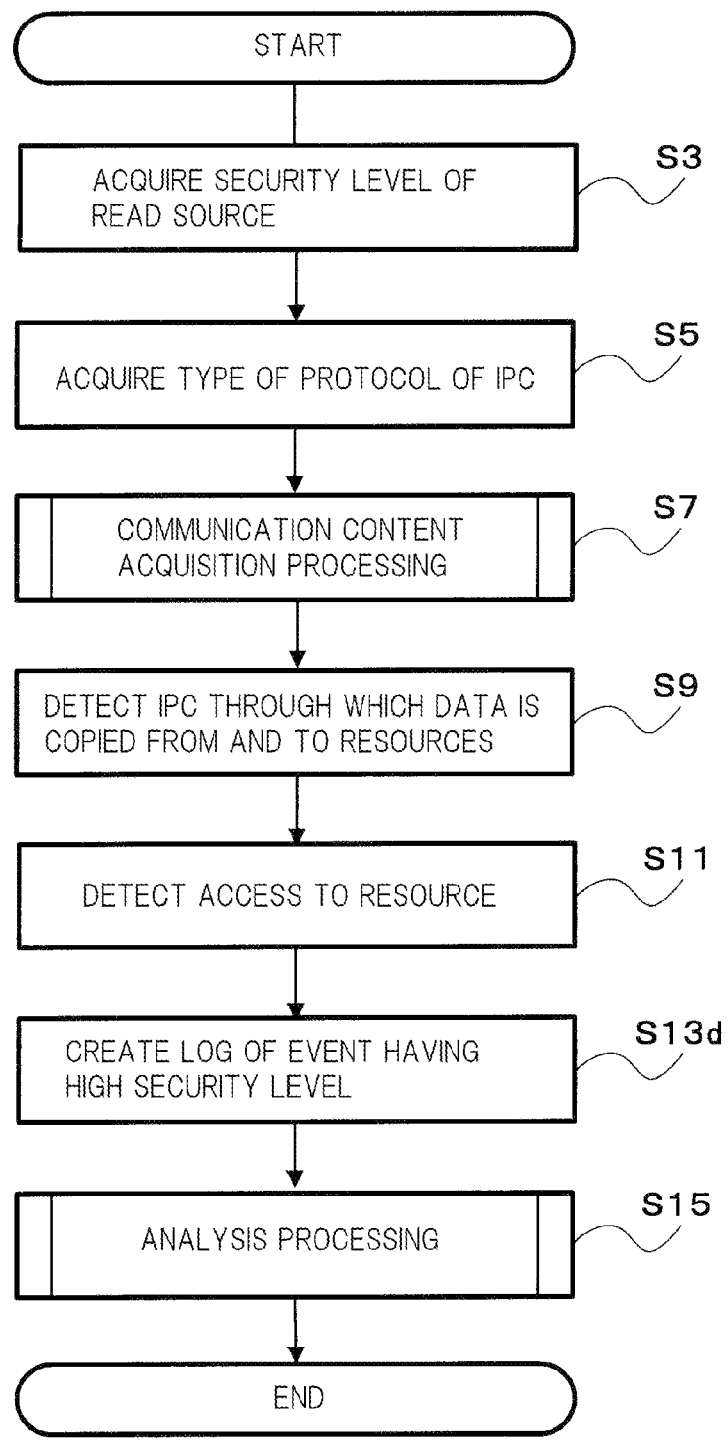
FIG. 25 is a flow chart showing an operation of a computer of a fifth exemplary embodiment according to the present invention.

FIG. 25 is a flow chart showing an operation of computer 1c of the present exemplary embodiment. Referring to FIG. 25, the operation of computer 1c is the same as the operation of computer 1 of the first embodiment except that log creation unit 157 performs step S13d instead of step S13.

After step S11, log creation unit 157 eliminates a record of an event whose security level is lower than a predetermined value, and records only an access event whose security level is not lower than the predetermined value (step S13d).

As described above, according to the present exemplary embodiment, only important events whose security level is high are noted, and hence the efficiency of data tracking is improved. Further, computer 1c can suppress the size of log 171.

(Sixth exemplary embodiment)

Figure 26:
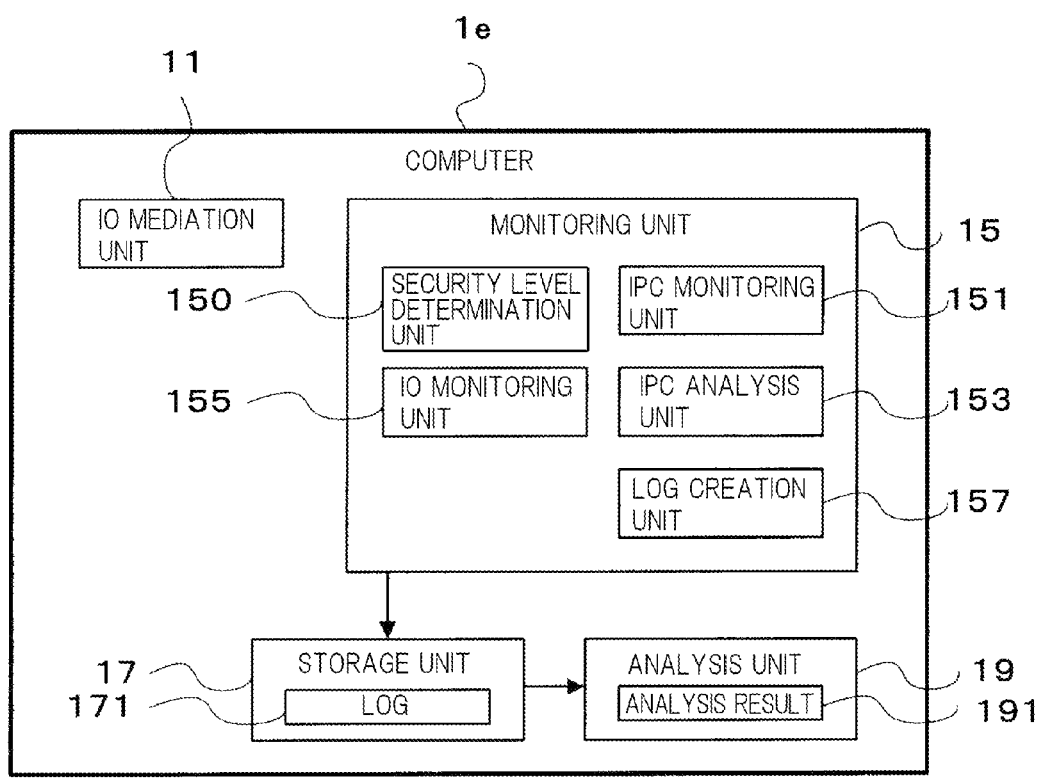
FIG. 26 is a block diagram showing a configuration of a computer of a sixth exemplary embodiment according to the present invention.

A sixth exemplary embodiment according to the present invention will be described. FIG. 26 is a block diagram showing a configuration of computer 1e of the present exemplary embodiment. Referring to FIG. 26, computer 1e is different from computer 1c of the fourth exemplary embodiment in that computer 1e further includes IO mediation unit 11.

Security level determination unit 150 further acquires the security level of a resource as a data write destination.

In the determination of the security level of the resource as the data write destination, security level determination unit 150 sets the security level of a specific storage apparatus, such as, for example, a USB (Universal Serial Bus) memory, to a level that is lower than the security level of the other storage apparatus. Further, security level determination unit 150 determines that the security level of a specific directory is higher or lower than the security level of the other directory. Security level determination unit 150 determines that the security level of HTTPS (Hypertext Transfer Protocol over Secure Socket layer) transmission to a specified server is higher than the security level of HTTPS transmission to an unspecified server.

In the case where IO mediation unit 11 mediates write IO to a resource, when the security level of the resource as the write destination is lower than the security level of the read source (dependence source of the write destination), IO mediation unit 11 inhibits the write operation by making the issuance of the system call unsuccessful.

Figure 27:
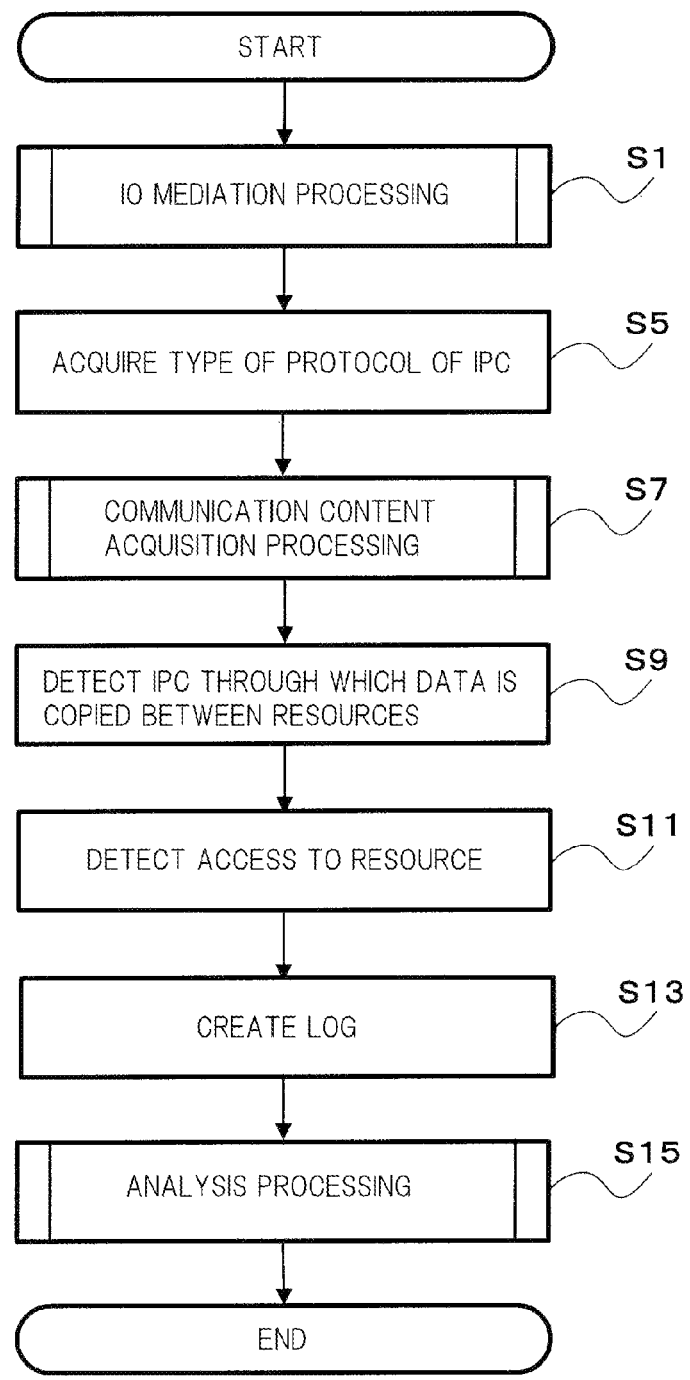
FIG. 27 is a flow chart showing an operation of the computer of the sixth exemplary embodiment according to the present invention.

FIG. 27 is a flow chart showing an operation of computer le of the present exemplary embodiment. Referring to FIG. 27, the operation of computer 1e is the same as the operation of computer 1 of the first exemplary embodiment except that computer 1e performs step S5 after performing 10 mediation processing (step S1).

Figure 28:
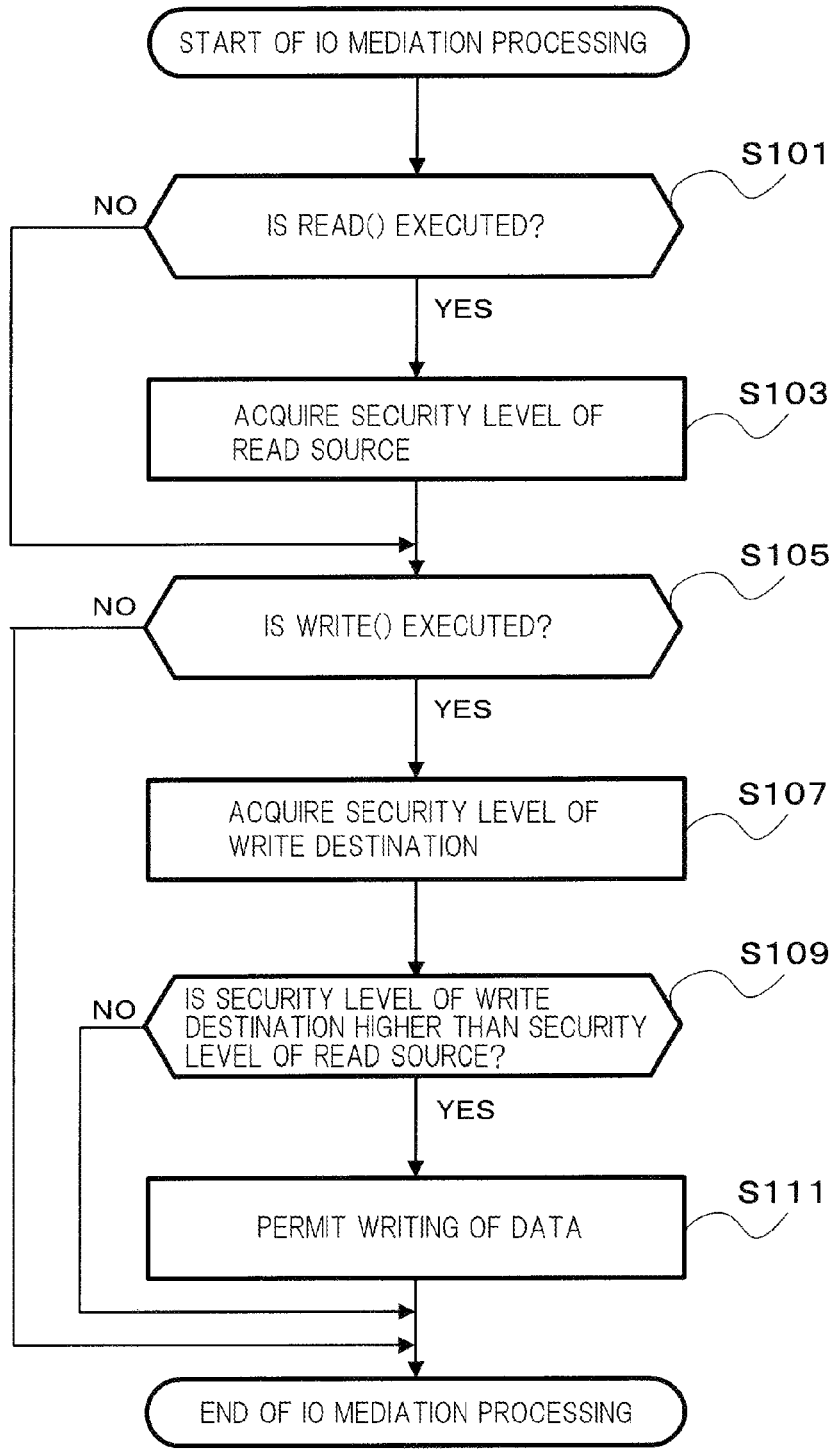
FIG. 28 is a flow chart showing IO mediation processing of the sixth exemplary embodiment according to the present invention.

FIG. 28 is a flow chart showing an operation of IO mediation processing of the present exemplary embodiment. Referring to FIG. 28, security level determination unit 150 determines whether a read process was performed (step S101). When a read process is performed (YES in step S101), security level determination unit 150 acquires the security level of the read source (step S103).

When no read process was performed (No in step S101), or after step S103, security level determination unit 150 determines whether a write process of writing the read data has been performed (step S105). When the write process is performed (YES in step S105), security level determination unit 150 acquires the security level of the write destination (step S107).

IO mediation unit 11 determines whether the security level of the resource, as the write destination, is higher than the security level of the resource as the read source (step S109).

When the security level of the resource as the write destination is higher than the security level of the resource as the read source (YES in step S109), IO mediation unit 11 permits the writing of the data to the resource as the write destination (step S111). After step S111, computer 1e ends IO mediation processing.

Note that the present exemplary embodiment is configured such that only confidential information is prevented from flowing to the outside, but may also be configured such that the security level of the user is also defined and only the user who is authorized to read confidential information can read the confidential information. This is achieved, for example, by such a configuration in which the security level of a user is assigned to a process opened by the user, and in which IO mediation unit 11 inhibits the reading from a resource whose security level higher than the security level of the process. Thereby, even when the user tries to perform reading from a resource whose security level is higher than the user's security level, the user cannot perform reading from the resource, and hence the confidential information is prevented from being disclosed to the user.

As described above, according to the present exemplary embodiment, when the security level of a resource as a read source is higher than the security level of a resource as a write destination, IO mediation unit 11 inhibits the writing to the resource. Thus, it is possible to prevent data having high confidentiality (high security level) from being written to a resource having low confidentiality (low security level).

As described in Non Patent Literature 1, tools for inhibiting the writing of a file having high confidentiality to a USB memory have been put into practical use, but these tools are not properly operated in the case where the contents of a file are modified by encryption, or the like, to the extent that the confidentiality of the file cannot be determined. On the other hand, computer 1e of the present exemplary embodiment tracks the exchange of data between processes, and hence the writing of the file can be correctly inhibited on the basis of the security level before the file is modified to the extent that the confidentiality of the file cannot be determined.

The possibility that the system becomes unstable by making the issuance of the system call unsuccessful is low. Since the system call for initiating file opening or network connection often fails (due to lack of file permission, a network connection error, or the like), suitable processing at the time of the failure of the system call is usually written in the application side. However, the system call for initiating IPC fails less frequently than these kinds of system calls, and hence processing at the time of the failure of the system call for initiating IPC is not suitably written in the application side in many cases. Therefore, when the system call for initiating IPC is made to fail, the operation of an existing application may become unstable (for example, application software crashes).

However, the present exemplary embodiment includes the feature in which access to a file of a process and the access to a network are controlled but the control of IPC is not performed. As a result, the present exemplary embodiment can prevent leakage of confidential data while minimizing the possibility of unstable operation of an existing application.

(Seventh exemplary embodiment)

Figure 29:
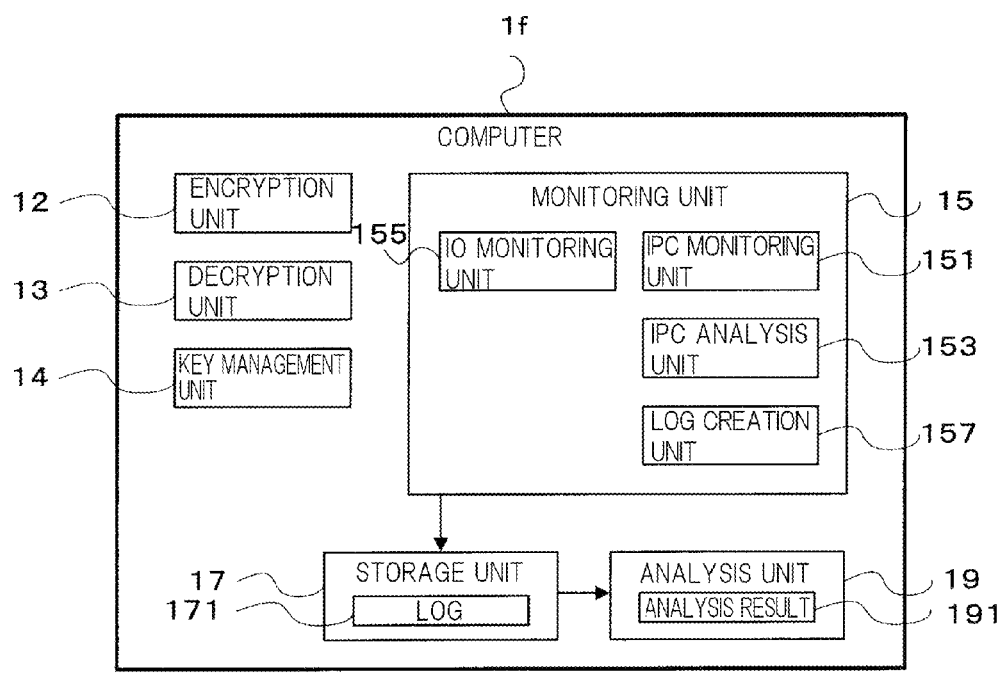
FIG. 29 is a block diagram showing a configuration of a computer of a seventh exemplary embodiment according to the present invention.

A seventh exemplary embodiment according to the present invention will be described. FIG. 29 is a block diagram showing a configuration of computer 1f of the present exemplary embodiment. Referring to FIG. 29, computer 1f is different from computer 1f of the first exemplary embodiment in that computer 1f further includes encryption unit 12, decryption unit 13, and key management unit 14.

In the case where, when data is written to a resource, the security level of the resource as the write destination is not lower than a predetermined value, encryption unit 12 encrypts the target data by using an encryption key corresponding to the security level.

Decryption unit 13 determines whether the data read from the resource is encrypted. For example, when a specific header is added to an encrypted file or an encrypted network packet, decryption unit 13 checks the header of the read data and thereby determines whether the read data is encrypted. When the read data is encrypted, decryption unit 13 acquires a key from key management unit 14 to decrypt the read data.

Key management unit 14 manages a key for encrypting and decrypting a file.

Computer 1f of the present exemplary embodiment performs IO mediation processing (step S1) before step S5 similarly to the sixth exemplary embodiment.

Figure 30:
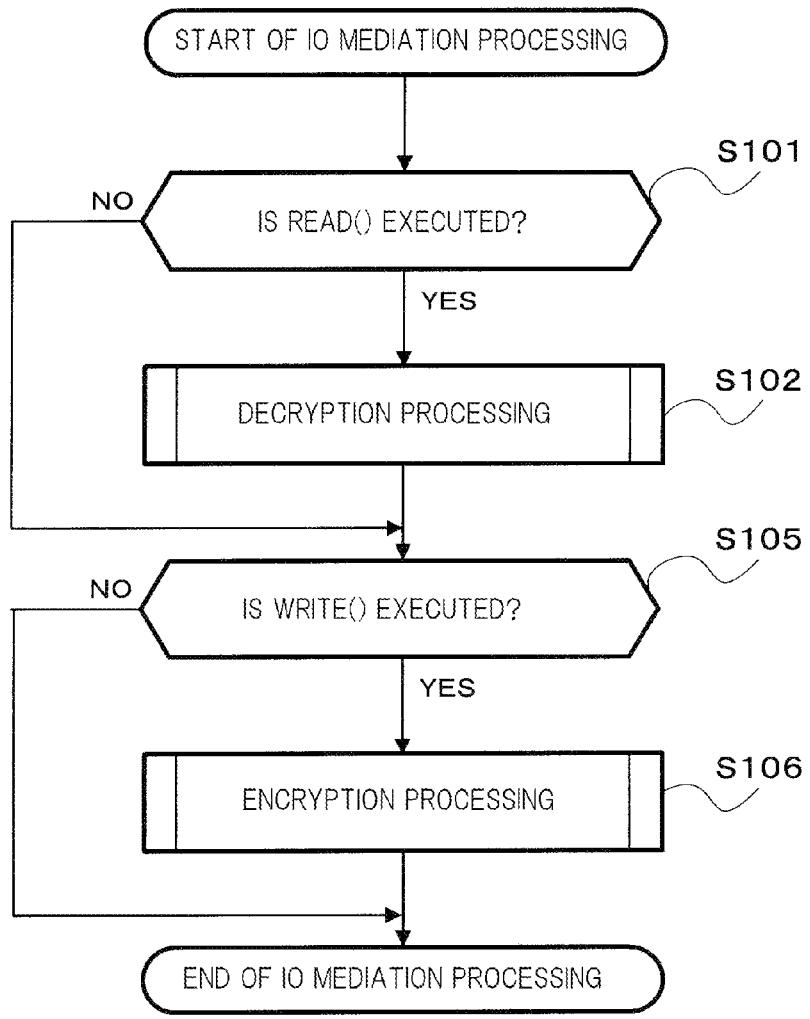
FIG. 30 is a flow chart showing IO mediation processing of the seventh exemplary embodiment according to the present invention.

FIG. 30 is a flow chart showing the IO mediation processing of the present exemplary embodiment. Referring to FIG. 30, decryption unit 13 determines whether a read process was performed (step S101). When a read process was performed (YES in step S101), decryption unit 13 performs decryption processing (step S102).

When no read process was performed (NO in step S101) or after step S102, decryption unit 13 determines whether a write process has been performed (step S105). When a write process was performed (YES in step S105), encryption unit 12 performs encryption processing (step S106). When no write process is performed (NO in step S105) or after step S106, computer 1f ends IO mediation processing.

Figure 31:
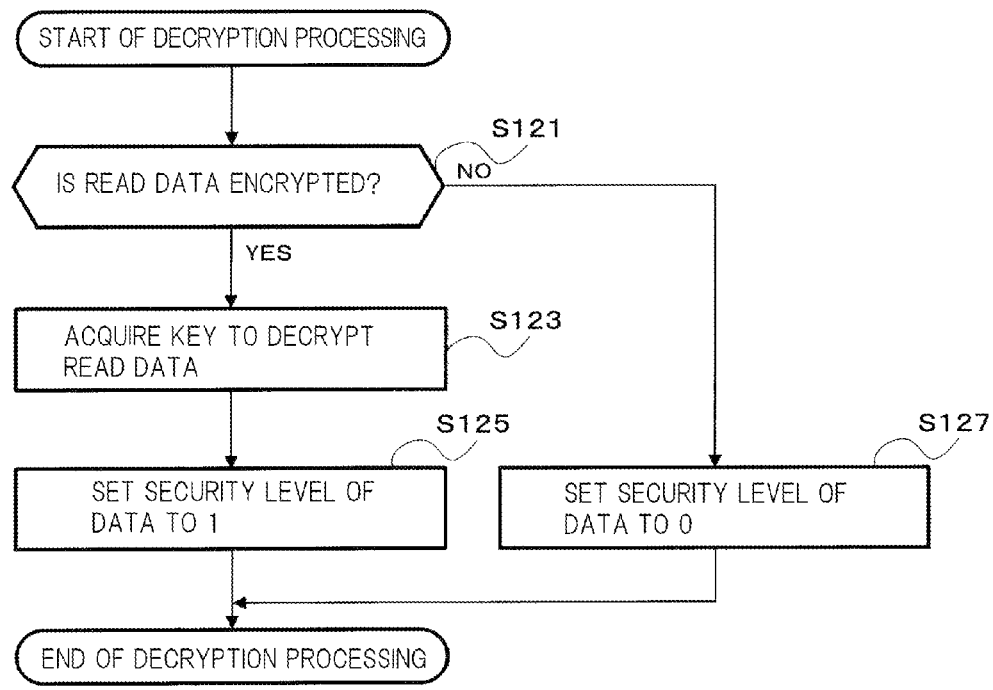
FIG. 31 is a flow chart showing decryption processing of the seventh exemplary embodiment according to the present invention.

FIG. 31 is a flow chart showing the decryption processing. Referring to FIG. 31, decryption unit 13 determines whether data read by the read process is encrypted (step S121).

When the data is encrypted (YES in step S121), decryption unit 13 acquires a key from key management unit 14, and decrypts the data by using the key (step S123). Then, decryption unit 13 sets the security level of the data to 1 (step S125).

When the data is not encrypted (NO in step S121), decryption unit 13 sets the security level of the data to 0 (step S127). After steps S125 and S127, decryption unit 13 ends the decryption processing.

Figure 32:
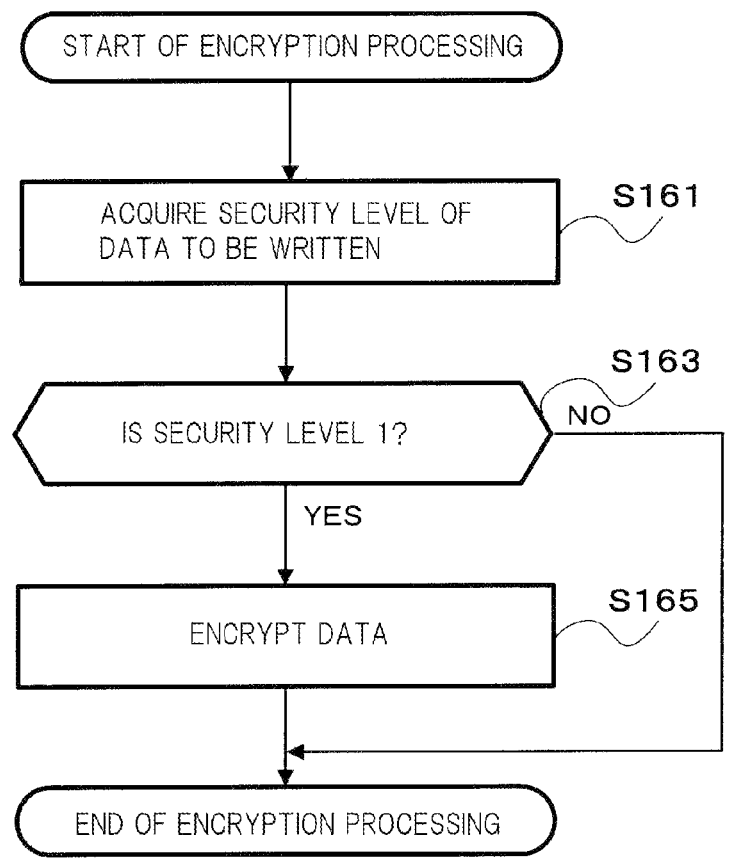
FIG. 32 is a flow chart showing encryption processing of the seventh exemplary embodiment according to the present invention.

FIG. 32 is a flow chart showing the encryption processing. Referring to FIG. 32, encryption unit 12 acquires the security level set to target data in write processing (step S161). Encryption unit 12 determines whether the acquired security level is 1 (step S163).

When the security level is 1 (YES in step S163), encryption unit 12 acquires a key from key management unit 14, and encrypts the target data (step S165). When the security level is not 1 (NO in step S163), or after step S 165, encryption unit 12 ends the encryption processing.

Note that, in order to avoid complication, the present exemplary embodiment is described as having a configuration in which all of the confidential resources are encrypted by using the same key managed by key management unit 14. However, encryption unit 12 may be configured to encrypt each of the data by using an individual key produced at random. Further, it may also be configured such that a public key encryption system is used to allow only decryption unit 13 to use a confidential key.

Further, in the present exemplary embodiment, the security level is divided into two stages ("0" and "1"), but the security level may be divided into three or more stages. In this case, computer 1f needs only to record, in the header, the information corresponding to the security level, so as to change the key according to the security level.

Further, the present exemplary embodiment is configured only to prevent confidential information from flowing in plain text to the outside. The present exemplary embodiment may also be configured such that the user's security level is also defined, and such that only the user authorized to read confidential information can read the confidential information. For example, the present exemplary embodiment may be configured such that the security level of a user is assigned to a process opened by the user, and such that decryption unit 13 prevents a key corresponding to a security level that is higher than the security level of the process from being assigned to the user. Thereby, even when the user tries to perform reading from a resource of a security level that is higher than the security level of the user, the user cannot perform the reading from the resource. Thus, it is possible to prevent the disclosure of confidential information to the user.

As described above, according to the present exemplary embodiment, computer 1f encrypts and writes confidential information. Thus, even when the confidential information is leaked to the outside by USB memory, a mail, or the like, the confidentiality of the data can be maintained as long as the key has not been leaked.

A similar technique can be realized by a so-called ERM (Enterprise Rights Management)/DRM (Digital Rights Management) tool such as IRM (Information Rights Management) embedded in MICROSOFT OFFICE 2003 (registered trademark). However, the ERM/DRM tool is realized by embedding, in application software, the processing for realizing the above-described operations, and hence the application software in which the processing can be embedded is limited. On the other hand, computer 1f of the present exemplary embodiment operates independently of application software.

Figure 33:
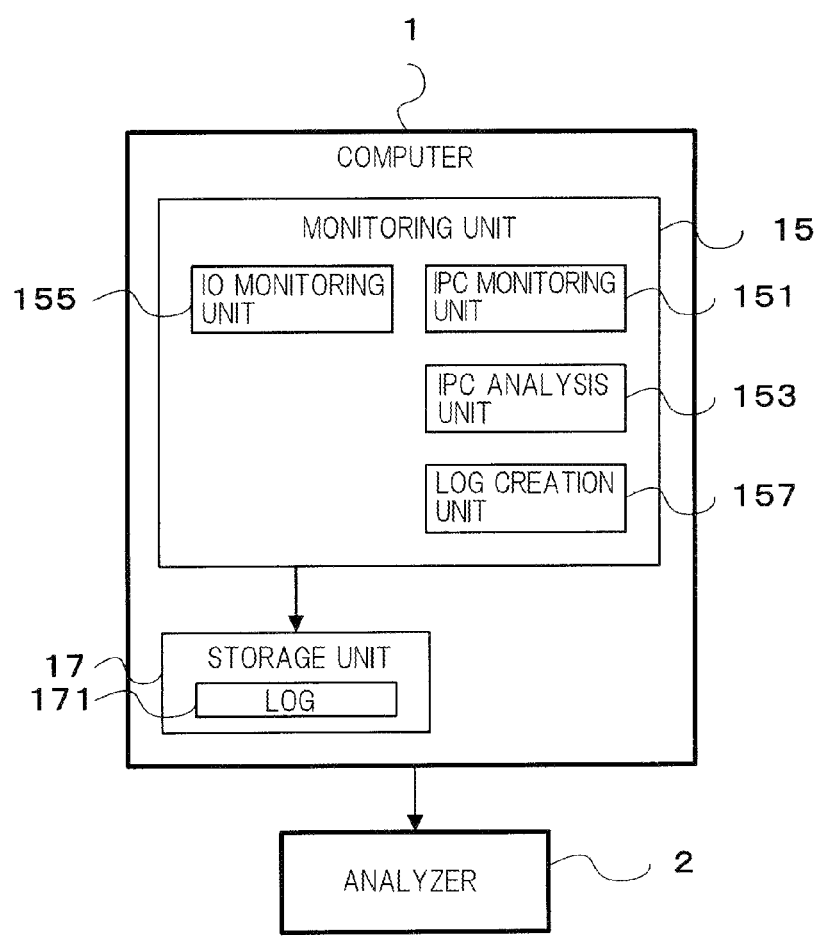
FIG. 33 is a block diagram showing a configuration of a computer and an analyzer of a modification according to the present invention.

Note that each of the above-described exemplary embodiments is configured such that computer 1 performs both the recording of logs and the analysis of dependence relationship, but may also be configured such that, as shown in FIG. 33, separate apparatuses (1 and 2) respectively perform the recording of logs and the analysis of dependence relationship.

REFERENCE SIGNS LIST 1, 1c, 1e, 1f Computer
2 Analyzer
12 Encryption unit
13 Decryption unit
14 Key management unit
15 Monitoring unit
17 Storage unit
19 Analysis unit
150 Security level determination unit
151 IPC monitoring unit
153 IPC analysis unit
155 IO monitoring unit
156 Dynamic information flow analysis unit
157 Log creation unit
171 Log
193 Analysis result
1561 Definition information
S5-S15, S71-S75, S91-S95, S151-S165, S9a, S91 a-S 97a, S159a, S13c, S15c, S155c, S13d, S101-S111, S121-S127, S161-S165 Step

The invention claimed is:

1. A data dependence analyzer comprising:
inter-process communication detection means which, on a basis of processing content of inter-process communication, detects the inter-process communication performed for transferring data to be copied between resources;
access detection means which successively detects access events to access the data in the resources during the inter-process communication;
dynamic information flow analysis means which checks the transfer of data in the inter-process communication until data read from a resource to the inter-process communication is written out by the inter-process communication and which adds a tag corresponding to a first resource to a memory buffer when data from the first resource is read to the memory buffer, and outputs information representing that a second resource is dependent on the first resource, when the data in the memory buffer is written to the second resource;
recording means which, for each of the access events detected by the access detection means, records an access target data in the access event; and
analysis means which, from among the access target data recorded by the recording means, searches data respectively corresponding to a copy source and a copy destination of the data transferred through the inter-process communication detected by the inter-process communication detection means and imparts a dependence relationship between the searched data,
wherein the analysis means searches data written to a resource by a communication destination process in the inter-process communication detected by the inter-process communication detection means, so as to set the searched data as copy destination data, and searches data read from the resource by a communication source process in the inter-process communication before copy destination data is written, so as to set the searched data as copy source data.

2. The data dependence analyzer according to claim 1, wherein, on a basis of a type of protocol used in inter-process communication and on a basis of processing content in the inter-process communication, the inter-process communication detection means detects inter-process communication for transferring data to be copied between the resources.

3. The data dependence analyzer according to claim 1, wherein the recording means further records capacity of the access target data by associating the capacity of the access target data with the access event, and
wherein the analysis means further defines a degree of the dependence relationship on a basis of the capacity associated with copy source data and with copy destination data.

4. The data dependence analyzer according to claim 1, further comprising
definition information defining a write system call which is called by a process of writing data to a resource, and an argument to which transfer source data in the write system call is set,
wherein, when the write system call is issued by the process of writing data, the recording means further stores, on a basis of the definition information, the transfer source data set to the argument by associating the transfer source data with the access target data, and
wherein the analysis means searches data written in a resource by a communication destination process in the inter-process communication detected by the inter-process communication detection means, so as to set the searched data as copy destination data, and sets, as copy source data, the transfer source data associated with the copy destination data.

5. The data dependence analyzer according to claim 1, wherein a security level representing a degree of confidentiality is set to a resource,
the data dependence analyzer further comprising security level acquisition means which, when data is read from the resource, acquires the security level set to the resource,
wherein the recording means further records the security level acquired by the security level acquisition means by associating the security level with the access target data, and wherein, from among access target data associated with the security level higher than a predetermined value, the analysis means searches data respectively corresponding to the copy source and the copy destination of the data transferred through the inter-process communication detected by the inter-process communication detection means.

6. The data dependence analyzer according to claim 5, wherein, when data is written to a resource, the security level acquisition means further acquires a security level of the write destination resource,
the data dependence analyzer further comprising write means which, when writing, to the write destination resource, data read from a resource as a read source, writes the read data to the write destination resource if the security level of the write destination resource, acquired by the security level acquisition means, is higher than a security level of the read source resource, acquired by the security level acquisition means.

7. The data dependence analyzer according to claim 5, further comprising:
encryption means which, when data is written to a resource, acquires a security level set to the write resource and encrypts data to write the encrypted data to the write resource if the acquired security level is higher than a predetermined value; and
decryption means which, when the encrypted data written by the encryption means is read from a read resource, acquires a security level set to the read resource and decrypts the encrypted data on a basis of the security level of the read resource.

8. A data dependence analysis method, comprising:
detecting inter-process communication performed for transferring data to be copied between resources using an inter-process communication detection unit;
detecting access events to access the data in the resources during the inter-process communication using an access detection unit;
checking the transfer of data in the inter-process communication until data read from a resource to the inter-process communication is written out by the inter-process communication using a dynamic information flow analysis unit;
adding a tag corresponding to a first resource to a memory buffer when data from the first resource is read to the memory buffer, and outputting information representing that a second resource is dependent on the first resource, when the data in the memory buffer is written to the second resource;
recording an access target data in the access event for each of the access events detected using a recording unit; and
searching, from among the access target data recorded, data respectively corresponding to a copy source and a copy destination of the data transferred through the inter-process communication detected and imparting a dependence relationship between the searched data using an access unit.

* * * * *